US012786573B2

(12) United States Patent
Nishio et al.

(10) Patent No.: US 12,786,573 B2
(45) Date of Patent: *Nov. 3, 2026

(54) IMAGING APPARATUS, DRIVING METHOD OF IMAGING APPARATUS, AND PROGRAM FOR SETTING EXPOSURE TIMES OF DIFFERENT PIXEL GROUPS

(71) Applicant: FUJIFILM Corporation, Tokyo (JP)

(72) Inventors: Yuya Nishio, Saitama (JP); Tomoyuki Kawai, Saitama (JP); Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 18/928,217

(22) Filed: Oct. 28, 2024

(65) Prior Publication Data

US 2025/0056128 A1 Feb. 13, 2025

Related U.S. Application Data

(63) Continuation of application No. 18/186,207, filed on Mar. 20, 2023, now Pat. No. 12,167,143, which is a (Continued)

(30) Foreign Application Priority Data

Sep. 29, 2020 (JP) ................................ 2020-163983

(51) Int. Cl.
*H04N 23/73* (2023.01)
*H04N 23/667* (2023.01)
(Continued)

(52) U.S. Cl.
CPC .......... *H04N 23/73* (2023.01); *H04N 23/667* (2023.01); *H04N 23/672* (2023.01);
(Continued)

(58) Field of Classification Search
CPC .... H04N 23/73; H04N 23/683; H04N 23/667; H04N 23/6812; H04N 23/741;
(Continued)

(56) References Cited

U.S. PATENT DOCUMENTS

| | | | |
|---|---|---|---|
| 7,956,925 | B2 | 6/2011 | Ogawa et al. |
| 9,270,911 | B2 | 2/2016 | Taniguchi |

(Continued)

FOREIGN PATENT DOCUMENTS

| | | |
|---|---|---|
| JP | 2010219958 | 9/2010 |
| JP | 2013121130 | 6/2013 |

(Continued)

OTHER PUBLICATIONS

"Notice of Reasons for Refusal of Japan Counterpart Application", issued on Jan. 7, 2025, with English translation thereof, p. 1-p. 5.

(Continued)

*Primary Examiner* — Kelly L Jerabek
(74) *Attorney, Agent, or Firm* — JCIPRNET

(57) ABSTRACT

The imaging apparatus includes: a processor; and an imaging element that has a first pixel group and a second pixel group arranged in the first direction, the first pixel group including phase difference pixels and imaging pixels and the second pixel group including imaging pixels. The processor is configured to set a first exposure time, during which the first pixel group is exposed, and a second exposure time, during which the second pixel group is exposed.

17 Claims, 17 Drawing Sheets

Related U.S. Application Data continuation of application No. PCT/JP2021/031097, filed on Aug. 25, 2021.

(51) Int. Cl.

| | |
|---|---|
| ***H04N 23/67*** | (2023.01) |
| ***H04N 23/68*** | (2023.01) |
| ***H04N 23/71*** | (2023.01) |
| ***H04N 23/741*** | (2023.01) |
| ***H04N 25/50*** | (2023.01) |
| ***H04N 25/53*** | (2023.01) |
| ***H04N 25/78*** | (2023.01) |

(52) U.S. Cl.

CPC ......... *H04N 23/6811* (2023.01); *H04N 23/71* (2023.01); *H04N 23/741* (2023.01); *H04N 25/50* (2023.01); *H04N 25/53* (2023.01); *H04N 25/78* (2023.01)

(58) Field of Classification Search

CPC .. H04N 23/71; H04N 23/672; H04N 23/6811; H04N 25/53; H04N 25/78; H04N 25/50; H04N 25/704; H04N 25/533

See application file for complete search history.

(56) References Cited

U.S. PATENT DOCUMENTS

| | | | | |
|---|---|---|---|---|
| 9,426,350 | B2 | 8/2016 | Konishi | |
| 10,531,025 | B2 | 1/2020 | Ogushi | |
| 12,167,143 | B2 * | 12/2024 | Nishio | H04N 23/73 |
| 2007/0273785 | A1 | 11/2007 | Ogawa | |
| 2012/0038810 | A1 * | 2/2012 | Taniguchi | H10F 39/8053 348/308 |
| 2017/0187949 | A1 * | 6/2017 | Kim | H04N 25/589 |
| 2017/0301718 | A1 | 10/2017 | Chou et al. | |
| 2017/0339353 | A1 | 11/2017 | Banachowicz et al. | |
| 2017/0353678 | A1 | 12/2017 | Ogushi | |
| 2018/0352199 | A1 * | 12/2018 | Hwang | H04N 25/704 |
| 2020/0077009 | A1 | 3/2020 | Nakamura | |
| 2020/0336719 | A1 * | 10/2020 | Morisawa | H04N 13/239 |
| 2021/0377479 | A1 | 12/2021 | Sakurabu et al. | |
| 2023/0402475 | A1 * | 12/2023 | Takahashi | H10F 39/813 |

FOREIGN PATENT DOCUMENTS

| | | |
|---|---|---|
| JP | 2015068959 | 4/2015 |
| JP | 2017216646 | 12/2017 |
| JP | 2020048135 | 3/2020 |
| JP | 2020108176 | 7/2020 |
| WO | 2006049098 | 5/2006 |
| WO | 2020183947 | 9/2020 |

OTHER PUBLICATIONS

"Office Action of Japan Counterpart Application", issued on Jun. 10, 2025, with English translation thereof, pp. 1-5.

"International Search Report (Form PCT/ISA/210) of PCT/JP2021/031097," mailed on Nov. 16, 2021, with English translation thereof, pp. 1-5.

"Written Opinion of the International Searching Authority (Form PCT/ISA/237) of PCT/JP2021/031097," mailed on Nov. 16, 2021, with English translation thereof, pp. 1-8.

"Notice of Allowance of U.S. Appl. No. 18/186,207", filed Jul. 26, 2024, pp. 1-15.

* cited by examiner

IMAGING APPARATUS, DRIVING METHOD OF IMAGING APPARATUS, AND PROGRAM FOR SETTING EXPOSURE TIMES OF DIFFERENT PIXEL GROUPS

CROSS-REFERENCE TO RELATED APPLICATIONS

This application is a continuation application of U.S. application Ser. No. 18/186,207 filed Mar. 20, 2023 the disclosure of which is incorporated herein by reference in its entirety. The application of U.S. application Ser. No. 18/186,207 is a continuation application of International Application No. PCT/JP2021/031097 filed Aug. 25, 2021 the disclosure of which is incorporated herein by reference in its entirety. Further, this application claims priorities from Japanese Patent Application No. 2020-163983, filed Sep. 29, 2020, the disclosure of which is incorporated herein by reference in their entirety.

TECHNICAL FIELD

The technique of the present disclosure relates to an imaging apparatus, a driving method of the imaging apparatus, and a program.

RELATED ART

The image processing apparatus described in JP2013-121130A comprises a synthesis processing unit that synthesizes first image data, which is based on first signal charge read out from a unit pixel on a first line of a solid-state imaging element exposed in the first exposure period, and second image data, which is based on second signal charge read out from a unit pixel on a second line of a solid-state imaging element different from the first line and exposed in a second exposure period that is included in the first exposure period and that is shorter than the first exposure period.

In the image sensor described in WO2006/049098A, a method of reading out signal charges accumulated in the imaging elements from an area sensor in which a plurality of imaging elements are arranged in a matrix is as follows. First, a plurality of exposure times having different time lengths are set, and the exposure times are individually distributed to each line of the area sensor. Next, the signal charges accumulated in the imaging elements during the assigned exposure times are read out in line units of the area sensor. Then, the readout signal charges are synthesized in units of screens of the area sensor.

SUMMARY

One embodiment according to the technique of the present disclosure provides an imaging apparatus, a driving method, and a program capable of appropriately determining whether a pixel group including phase difference pixels has a short-time exposure or a long-time exposure.

In order to achieve the above-mentioned object, in the imaging apparatus according to an aspect of the present disclosure, there is provided an imaging apparatus comprising: a processor; and an imaging element that has a first pixel group and a second pixel group arranged in the first direction, the first pixel group including a plurality of phase difference pixels and a plurality of imaging pixels and the second pixel group including a plurality of imaging pixels. The processor is configured to set a first exposure time, during which the first pixel group is exposed, and a second exposure time, during which the second pixel group is exposed.

It is preferable that the imaging element has column signal lines, which are for reading out signals and extend in the first direction, and the first pixel group includes the plurality of phase difference pixels and the plurality of imaging pixels that are arranged in a second direction intersecting the first direction and the second pixel group includes the plurality of imaging pixels arranged in the second direction.

It is preferable that the processor is configured to set one of the first exposure time and the second exposure time shorter than the other, and determine which of the first exposure time and the second exposure time is made shorter than the other on the basis of information of a subject imaged by the imaging element.

It is preferable that the processor is configured to cause the imaging element to detect a brightness of a region-of-interest in an imaging region as the information, and determine the first exposure time and the second exposure time on the basis of the detected brightness.

It is preferable that the processor is configured to make the first exposure time shorter than the second exposure time in a case where the brightness is equal to or greater than a first threshold value, and make the second exposure time shorter than the first exposure time in a case where the brightness is less than the first threshold value.

It is preferable that the processor is configured to detect a speed of movement of the subject as the information and determine the first exposure time and the second exposure time on the basis of the detected speed of movement.

It is preferable that the processor is configured to make the first exposure time shorter than the second exposure time in a case where the speed of movement is equal to or greater than a second threshold value, and make the second exposure time shorter than the first exposure time in a case where the speed of movement is less than the second threshold value.

It is preferable that the processor is configured to read out a signal of one of the first pixel group and the second pixel group, and then read out a signal of the other of the first pixel group and the second pixel group, in a frame period.

In the imaging apparatus according to the aspect of the present disclosure, the processor is configured to detect a position of the subject in an imaging region of the imaging element in the first direction, read out a signal of one of the first pixel group and the second pixel group from the other direction side, and then read out a signal of the other of the first pixel group and the second pixel group from the one direction side, in a case where the detected position is on one direction side in the first direction, and read out a signal of one of the first pixel group and the second pixel group from the one direction side, and then read out a signal of the other of the first pixel group and the second pixel group from the other direction side, in a case where the detected position is on the other direction side.

It is preferable that the processor is configured to execute synthesis processing of generating a video signal by synthesizing a signal which is read out from the first pixel group and a signal which is read out from the second pixel group.

It is preferable that the processor is configured to execute phase processing of reducing a phase shift between the signal which is read out from the first pixel group and the signal which is read out from the second pixel group, and then execute the synthesis processing.

It is preferable that the processor is configured to perform the phase processing on the signal which is read out from the second pixel group.

It is preferable that the processor is configured to perform electronic vibration-proof processing on the video signal generated by the synthesis processing.

It is preferable that the processor is configured to perform electronic vibration-proof processing on the video signal generated by the synthesis processing.

According to an aspect of the present disclosure, there is provided a driving method of an imaging apparatus including an imaging element that has a first pixel group and a second pixel group arranged in a first direction, the first pixel group including a plurality of phase difference pixels and a plurality of imaging pixels and the second pixel group including a plurality of imaging pixels. The driving method comprises: setting a first exposure time, during which the first pixel group is exposed, and a second exposure time, during which the second pixel group is exposed.

According to an aspect of the present disclosure, there is provided a non-transitory computer-readable storage medium storing a program for operating an imaging apparatus including an imaging element that has a first pixel group and a second pixel group arranged in a first direction, the first pixel group including a plurality of phase difference pixels and a plurality of imaging pixels and the second pixel group including a plurality of imaging pixels.

The program causes the imaging apparatus to execute setting a first exposure time, during which the first pixel group is exposed, and a second exposure time, during which the second pixel group is exposed.

DETAILED DESCRIPTION

An example of an embodiment relating to the technique of the present disclosure will be described with reference to the accompanying drawings.

First, the wording used in the following description will be described.

In the following description, the "IC" is an abbreviation for "Integrated Circuit". The "CPU" is an abbreviation for "Central processing Unit". The "ROM" is an abbreviation for "Read Only Memory". The "RAM" is an abbreviation for "Random Access Memory". The "CMOS" is an abbreviation for "Complementary Metal Oxide Semiconductor". The "HDR" is an abbreviation for "High Dynamic Range". The "AF" is an abbreviation for "Auto Focus". The EEPROM is an abbreviation for "Electrically Erasable Programmable Read-Only Memory".

The "FPGA" is an abbreviation for "Field-Programmable Gate Array". The "PLD" is an abbreviation for "Programmable Logic Device". The "ASIC" is an abbreviation for "Application Specific Integrated Circuit". The "JPEG" is an abbreviation for "Joint Photographic Experts Group".

As used herein, the term "equal" includes not only being exactly equal, but also being substantially equal in the sense that it includes errors that are generally tolerated in the art of the technique of the present disclosure.

First Embodiment

As a first embodiment of the imaging apparatus, the technique of the present disclosure will be described by using an interchangeable lens digital camera as an example. The technique of the present disclosure is not limited to the interchangeable lens type, and can be applied to a digital camera having a lens integrated therein.

(Configuration of Imaging Apparatus)

Figure 1:
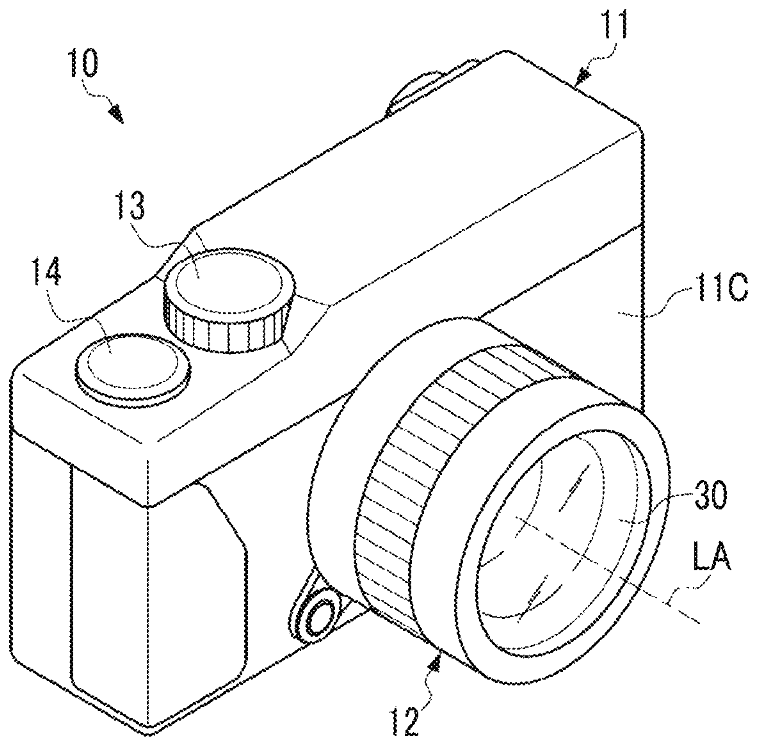
FIG. 1 is a schematic perspective view showing an example of a front side of an imaging apparatus.

FIG. 1 shows an example of a front side of an imaging apparatus 10. As shown in FIG. 1, the imaging apparatus 10 is an interchangeable lens digital camera. The imaging apparatus 10 is composed of a body 11 and an imaging lens 12 which is interchangeably mounted on the body 11. The imaging lens 12 is mounted on the front surface 11C side of the body 11 through the camera side mount 11A and the lens side mount 12A (refer to FIG. 3). The imaging lens 12 is an example of a lens according to the technique of the present disclosure.

A dial 13 and a release button 14 are provided on an upper surface of the body 11. The dial 13 is operated in a case of setting the operation mode or the like. Examples of the operation mode of the imaging apparatus 10 include a still picture imaging mode, a motion picture imaging mode, and an image display mode. The release button 14 is operated by a user at the time of starting execution of the still picture imaging or the motion picture imaging.

Figure 2:
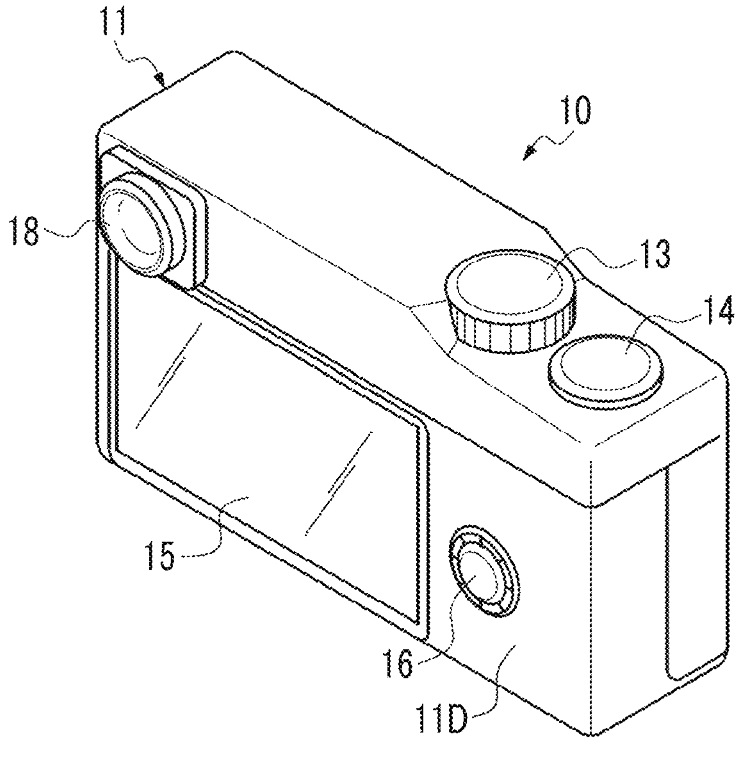
FIG. 2 is a schematic perspective view showing an example of a rear side of the imaging apparatus.

FIG. 2 shows an example of the rear side of the imaging apparatus 10. As shown in FIG. 2, a display 15, an instruction button 16, and a finder eyepiece portion 18 of a finder not shown in the drawing are provided on the rear surface 11D of the body 11. As the finder, an optical view finder or an electronic view finder can be adopted. The display 15 displays an image on the basis of a video signal obtained by imaging, various menu screens, and the like. The instruction button 16 receives various instructions.

Figure 3:
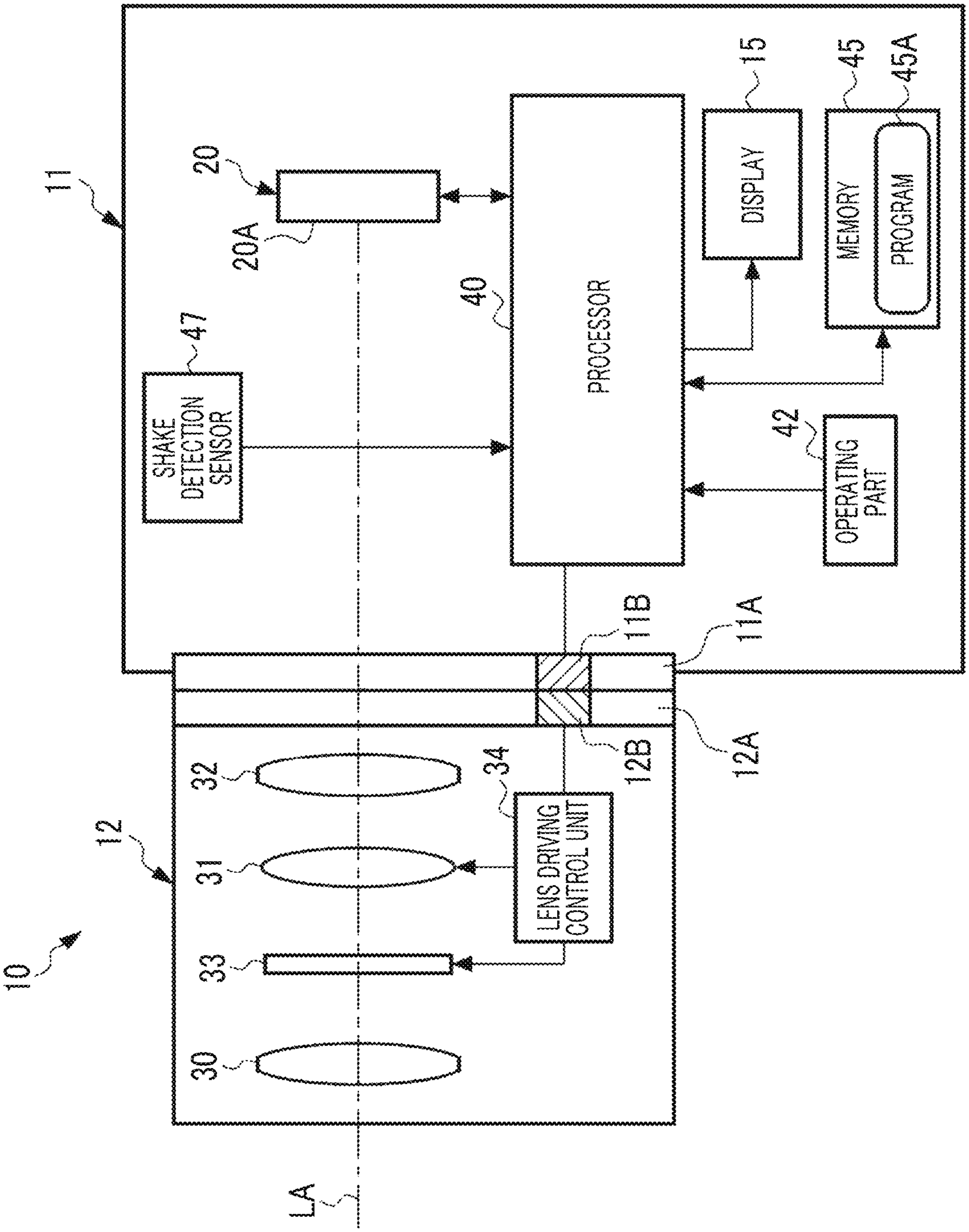
FIG. 3 is a diagram showing an example of an internal configuration of the imaging apparatus.

FIG. 3 shows an example of an internal configuration of the imaging apparatus 10. The body 11 and the imaging lens 12 are electrically connected to each other by bringing an electrical contact 11B provided on a camera side mount 11A into contact with an electrical contact 12B provided on a lens side mount 12A.

The imaging lens 12 includes an objective lens 30, a focus lens 31, a rear end lens 32, and a stop 33. Each member is disposed in the order of the objective lens 30, the stop 33, the focus lens 31, and the rear end lens 32 from the objective side along an optical axis LA of the imaging lens 12. The objective lens 30, the focus lens 31, the rear end lens 32, and an imaging optical system are configured. The type, number, and arrangement order of the lenses constituting the imaging optical system are not limited to the example shown in FIG. 3.

Further, the imaging lens 12 has a lens driving control unit 34. The lens driving control unit 34 is composed of, for example, a CPU, a RAM, a ROM, or the like. Furthermore, the ROM also includes a rewritable EEPROM, a flash memory, and the like. The lens driving control unit 34 is electrically connected to a processor 40 in the body 11 through the electrical contact 12B and the electrical contact 11B.

The lens driving control unit 34 drives the focus lens 31 and the stop 33 on the basis of a control signal which is transmitted from the processor 40. In order to adjust focus of the imaging lens 12, the lens driving control unit 34 performs driving control of the focus lens 31 on the basis of a control signal for focus adjustment transmitted from the processor 40. The processor 40 performs the focus adjustment of a phase difference method.

The body 11 is provided with an imaging sensor 20, a processor 40, an operating part 42, a memory 45, a display 15, and a shake detection sensor 47. The processor 40 controls operations of the imaging sensor 20, the memory 45, and the display 15. The processor 40 is composed of, for example, a CPU, a RAM, a ROM, or the like. In such a case, the processor 40 executes various kinds of processing on the basis of a program 45A stored in the memory 45. The processor 40 may be composed of an aggregate of a plurality of IC chips. In addition, the imaging sensor 20 is, for example, a CMOS image sensor. The imaging sensor 20 is an example of the "imaging element" according to the technique of the present disclosure.

Figure 4:
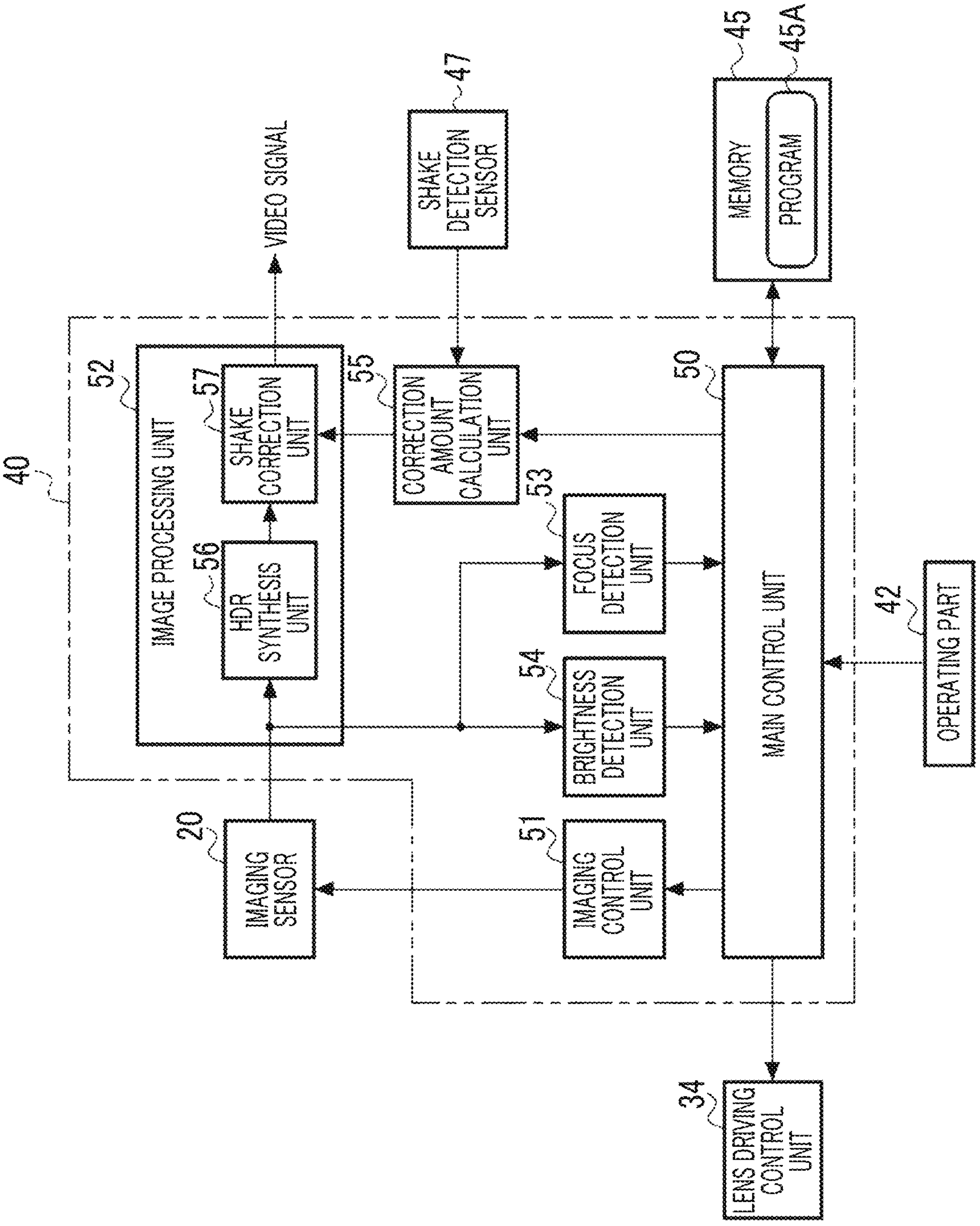
FIG. 4 is a block diagram showing an example of a functional configuration of a processor.

The display 15 displays an image on the basis of a video signal generated by the image processing unit 52 (refer to FIG. 4). The image includes a still picture, a motion picture, and a live view image. The live view image is an image that is displayed in real time on the display 15 by sequentially outputting the image data, which is generated by the image processing unit 52, to the display 15.

The video signal generated by the image processing unit 52 can be stored as image data in an internal memory (not shown in the drawing) built in the body 11 or a storage medium (for example, a memory card) that can be attached to and detached from the body 11.

The operating part 42 includes the dial 13, the release button 14, and the instruction button 16 (refer to FIGS. 1 and 2) described above. The processor 40 controls each unit in the body 11 and the lens driving control unit 34 in the imaging lens 12 in response to an operation of the operating part 42.

The shake detection sensor 47 detects an amount of shake delivered to the imaging apparatus 10. The shake detection sensor 47 is, for example, a 5-axis shake detection sensor that detects shake in each of the roll direction, the yaw direction, the pitch direction, the X direction, and the Y direction. The X direction and the Y direction are directions orthogonal to the optical axis LA.

The shake detection sensor 47 is composed of, for example, a gyro sensor (not shown in the drawing) that detects rotational shake and angular shake, and an acceleration sensor (not shown in the drawing) that detects translational shake. The shake detection sensor 47 outputs a detected shake detection signal to the processor 40. It should be noted that the shake detection sensor 47 may be provided in the imaging lens 12. In such a case, the processor 40 may acquire a detected value of the amount of shake from the shake detection sensor 47 in the imaging lens 12 through the electrical contact 12B and the electrical contact 11B.

(Processor Configuration)

FIG. 4 shows an example of a functional configuration of the processor 40. The processor 40 implements various functional units by executing processing in accordance with the program 45A stored in the memory 45. As shown in FIG. 4, for example, in the processor 40, a main control unit 50, an imaging control unit 51, an image processing unit 52, a focus detection unit 53, a brightness detection unit 54, and a correction amount calculation unit 55 are implemented.

The main control unit 50 comprehensively controls an operation of the imaging apparatus 10 on the basis of an instruction signal which is input from the operating part 42. The imaging control unit 51 controls the imaging sensor 20 to execute an imaging processing of causing the imaging sensor 20 to perform an imaging operation. The imaging control unit 51 drives the imaging sensor 20 in the still picture imaging mode or the motion picture imaging mode. Further, the imaging control unit 51 implements an HDR function of generating a high dynamic range (HDR) image in which a dynamic range is expanded in the still picture imaging mode or the motion picture imaging mode.

A user is able to perform selection between the still picture imaging mode and the motion picture imaging mode by the operating part 42. Further, a user is able to set the exposure value including the shutter speed and the F number by operating the operating part 42. Further, a user is able to select on/off of the HDR function by operating the operating part 42.

Further, a user is able to select the automatic focus detection (hereinafter referred to as AF) mode by operating the operating part 42. In a case where the AF mode is selected, the main control unit 50 controls a position of the focus lens 31 on the basis of a focus detection result detected by the focus detection unit 53.

The focus detection unit 53 performs focus detection on the basis of signals which are output from the phase difference pixels ZL and ZR (refer to FIGS. 7 and 8) among the video signals which are output from the imaging sensor 20. It should be noted that the focus detection refers to detecting a position of the focus lens 31 in which a subject is in focus.

Further, the focus detection unit 53 performs the focus detection on the basis of the signals which are output from the phase difference pixels ZL and ZR (refer to FIG. 7) included in the AF area 21A (refer to FIG. 9) which is set in the imaging region 21 of the imaging sensor 20. For example, the position and the size of the AF area 21A in the imaging region 21 can be set by a user operating the operating part 42. The position and the size of the AF area 21A may be set on the basis of a result of subject detection (for example, face detection) which is performed by the main control unit 50 using the video signal. The AF area 21A is an example of a "region-of-interest" according to the technique of the present disclosure. In a case of imaging with a focus fixed, the AF area 21A may be another subject region which is different from the focal region and which can be determined by a user or the imaging apparatus.

The brightness detection unit 54 detects the brightness of the AF area 21A (an example of the region-of-interest) on the basis of the video signal which is output from the imaging sensor 20. The main control unit 50 performs exposure time setting processing on the basis of the brightness of the AF area 21A detected by the brightness detection unit 54.

The correction amount calculation unit 55 calculates a correction amount for performing electronic shake correction (that is, electronic vibration-proof processing) on the basis of the detected value of the amount of shake which is output from the shake detection sensor 47. The correction amount calculation unit 55 outputs the calculated correction amount to the image processing unit 52.

The image processing unit 52 performs various kinds of image processing on the video signal to generate image data in a predetermined file format (for example, JPEG format or the like). The image data which is output from the image processing unit 52 is recorded in, for example, the memory 45. Further, the video signal constituting the image data is output from the image processing unit 52 to the display 15, and the display 15 displays the image thereof.

Further, the image processing unit 52 includes an HDR synthesis unit 56 and a shake correction unit 57. The HDR synthesis unit 56 operates in a case where the HDR function is turned on. The shake correction unit 57 operates in a case where the motion picture imaging mode is selected.

The HDR synthesis unit 56 generates an HDR image by synthesizing a pair of video signals having different exposure times which are output from the imaging sensor 20 in a case where the HDR function is turned on.

The shake correction unit 57 performs the electronic vibration-proof processing on the video signal on the basis of the correction amount which is input from the correction amount calculation unit 55 in the motion picture imaging mode. For example, the electronic vibration-proof processing is performed by changing the cut-out region on the basis of the correction amount for each frame of the video signal. In a case where the HDR function is turned on, the shake correction unit 57 performs the electronic vibration-proof processing on the video signal (that is, the HDR image) generated by the HDR synthesis unit 56. Thereby, the electronic vibration-proof processing can be simplified and the speed of the electronic vibration-proof processing in the processor 40 can be increased. Further, it is preferable that the shake correction unit 57 performs the electronic vibration-proof processing on the HDR image which is subjected to the demosaic processing.

(Configuration of Imaging Sensor)

Figure 5:
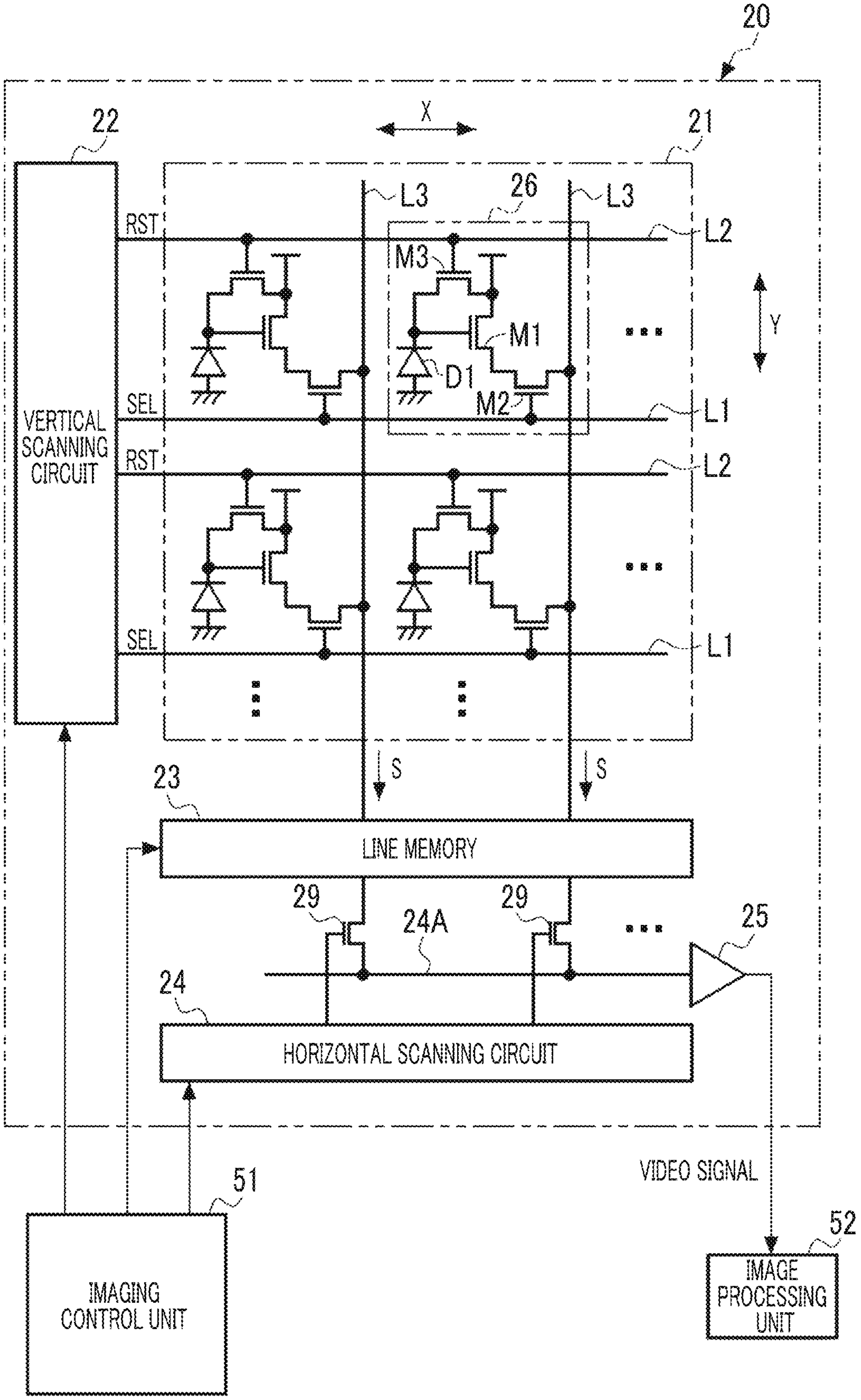
FIG. 5 is a diagram showing an example of a configuration of an imaging sensor.

FIG. 5 shows an example of a configuration of the imaging sensor 20. The imaging sensor 20 shown in FIG. 5 is a CMOS image sensor. The imaging sensor 20 includes the imaging region 21, a vertical scanning circuit 22, a line memory 23, a horizontal scanning circuit 24, and an output amplifier 25.

In the imaging region 21, a plurality of pixels 26 are arranged in a two-dimensional matrix along the X direction and the Y direction. Further, in the imaging region 21, a plurality of row selection lines L1 and a plurality of row reset lines L2 are wired along the X direction, and a plurality of column signal lines L3 are wired along the Y direction.

The column signal line L3 extends in the Y direction. The row selection line L1 and the row reset line L2 extend in the X direction intersecting with the Y direction. The Y direction is an example of the "first direction" according to the technique of the present disclosure. The X direction is an example of the "second direction" according to the technique of the present disclosure.

The pixel 26 is connected to the row selection line L1, the row reset line L2, and the column signal line L3. Hereinafter, a plurality of pixels 26 arranged in the X direction may be simply referred to as "row". Although details will be described later, some of the plurality of pixels 26 are the phase difference pixels for performing focus adjustment.

The pixel 26 has a photodiode D1, an amplifier transistor M1, a pixel selection transistor M2, and a reset transistor M3. The photodiode D1 performs photoelectric conversion of incident light to generate a signal charge corresponding to an amount of the incident light and accumulate the generated signal charge. The amplifier transistor M1 generates a voltage (hereinafter referred to as a pixel signal S) corresponding to an amount of the signal charge accumulated in the photodiode D1.

The pixel selection transistor M2 is controlled by the vertical scanning circuit 22 through the row selection line L1 and outputs the pixel signal S, which is generated by the amplifier transistor M1, to the column signal line L3. The reset transistor M3 is controlled by the vertical scanning circuit 22 through the row reset line L2, and discards the signal charge, which is accumulated in the photodiode D1, to the power supply line. Hereinafter, discarding of the signal charge from the photodiode D1 is referred to as reset of the pixel 26.

The vertical scanning circuit 22 generates a row selection signal SEL and a reset signal RST on the basis of the vertical synchronization signal which is input from the imaging control unit 51. In the signal readout operation, the vertical scanning circuit 22 provides the row selection signal SEL to the row selection line L1 to output the pixel signal S from the pixel 26, which is connected to the row selection line L1, to the column signal line L3.

Further, the vertical scanning circuit 22 resets the pixel 26, which is connected to the row reset line L2, by giving the reset signal RST to the row reset line L2 during the reset operation.

The line memory 23 stores the pixel signal S which is output from the pixel 26 for one line. The line memory 23 is constituted of a capacitor or the like. The line memory 23 is connected to the horizontal output line 24A through a transistor 29 as a switch. The output amplifier 25 is connected to the end part of the horizontal output line 24A. The horizontal scanning circuit 24 sequentially outputs the pixel signals S for one line stored in the line memory 23 to the horizontal output line 24A by performing horizontal scanning in which the transistors 29 are sequentially selected. The pixel signal S, which is output to the horizontal output line 24A, is output to the external image processing unit 52 as a video signal through the output amplifier 25.

The imaging control unit 51 controls operations of the vertical scanning circuit 22, the line memory 23, and the horizontal scanning circuit 24 (refer to FIG. 4). The imaging control unit 51 controls the vertical scanning circuit 22 to output the pixel signal S while sequentially selecting the row selection line L1 one row at a time. Further, the imaging control unit 51 resets the pixels 26 by controlling the vertical scanning circuit 22.

Figure 10:
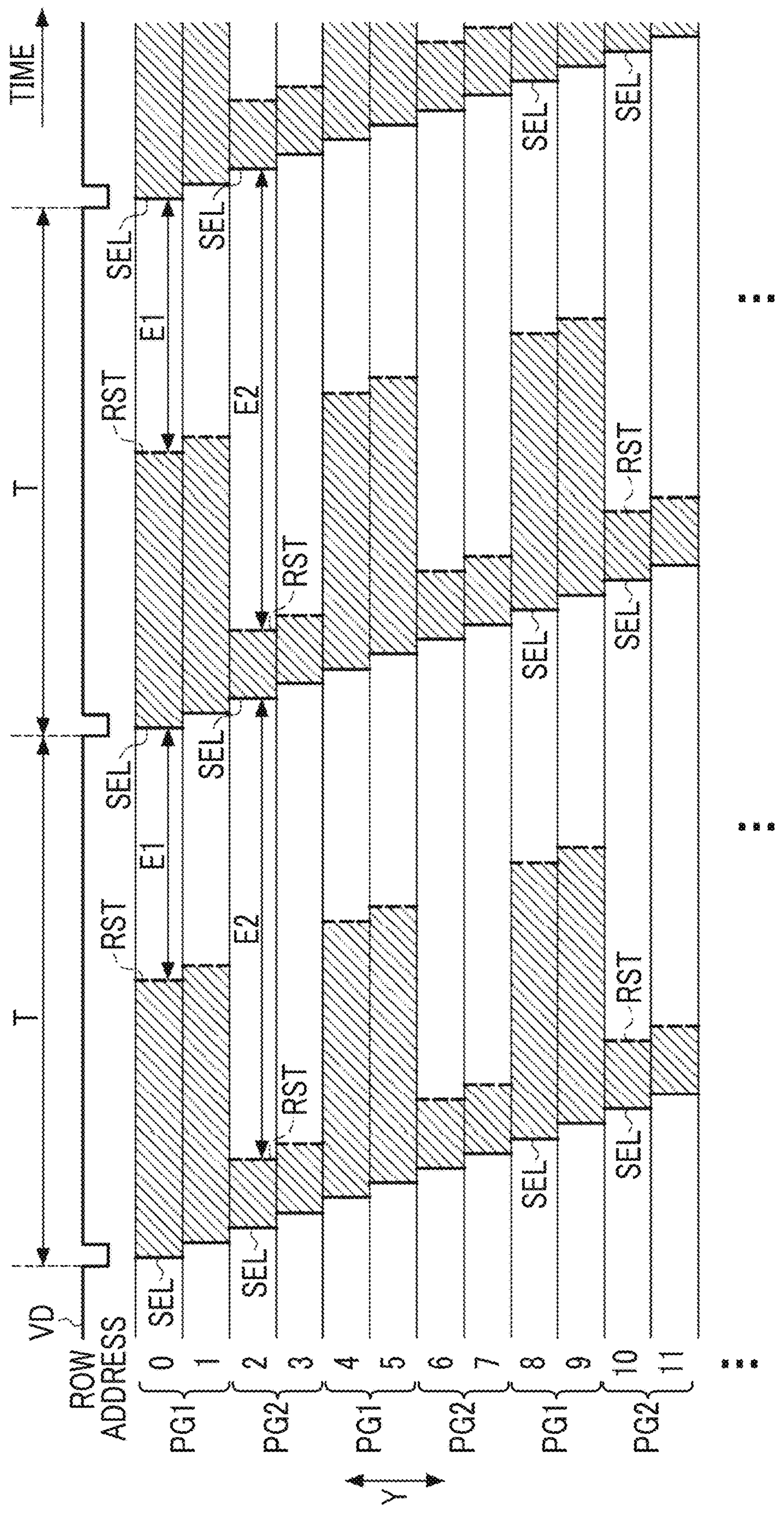
FIG. 10 is a diagram showing an example of imaging timing at which a brightness of an AF area is equal to or greater than a first threshold value.
Figure 11:
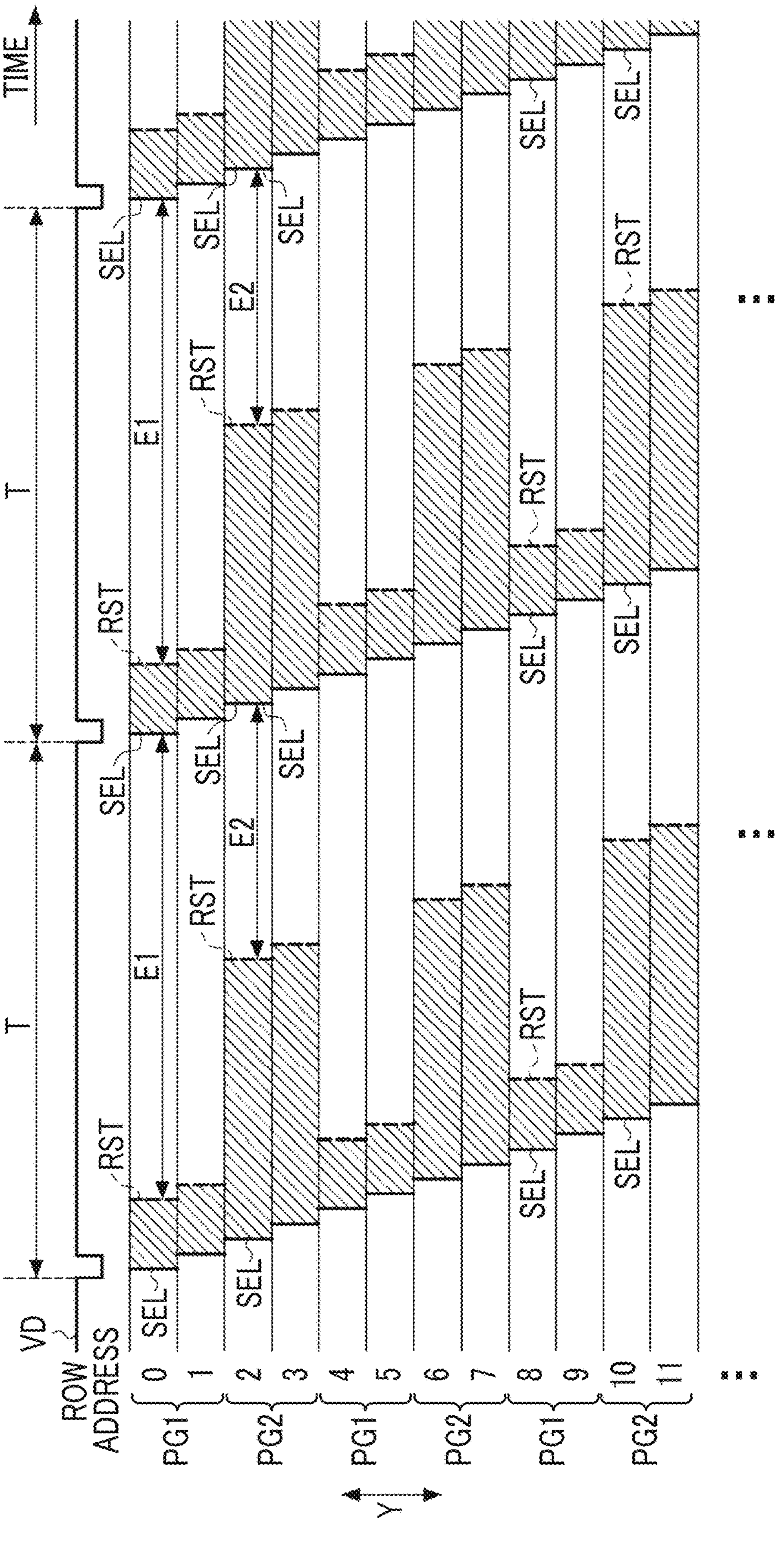
FIG. 11 is a diagram showing an example of imaging timing at which the brightness of the AF area is less than the first threshold value.

In the motion picture imaging mode, the imaging control unit 51 drives the imaging sensor 20 in a constant frame cycle T (refer to FIGS. 10 and 11). The imaging control unit 51 causes the imaging sensor 20 to repeatedly execute operations of reading out and resetting the video signal in the frame cycle T.

The configuration of the imaging sensor 20 is not limited to the configuration shown in FIG. 5. For example, the imaging sensor 20 may be provided with an A/D converter.

(Configuration of Pixels)

Figure 6:
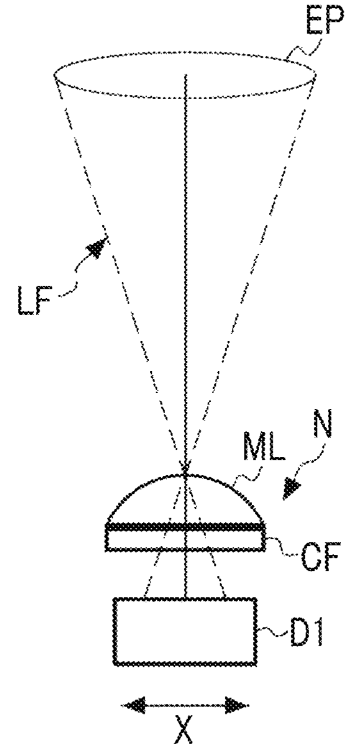
FIG. 6 is a diagram showing an example of a configuration of imaging pixels.
Figure 7:
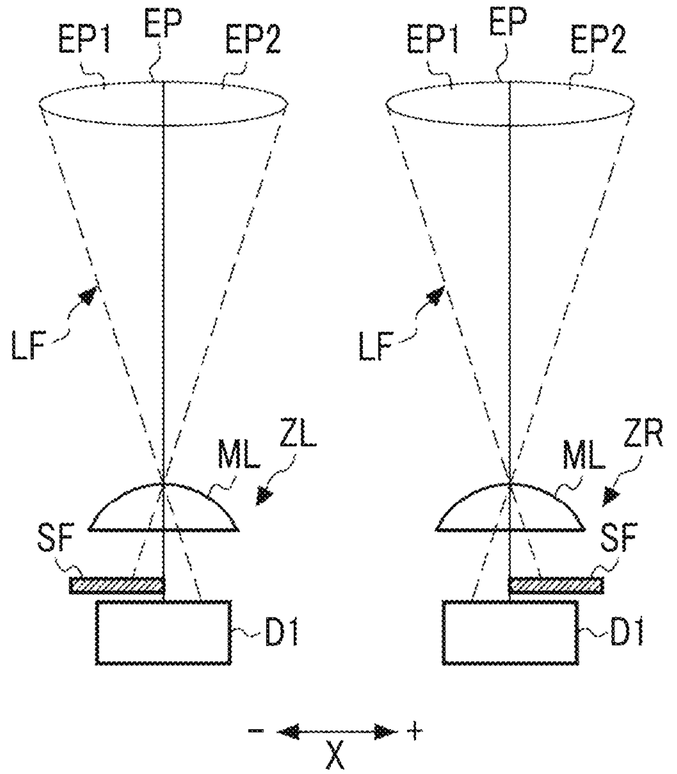
FIG. 7 is a diagram showing an example of a configuration of phase difference pixels.

The plurality of pixels 26, which are arranged in the imaging region 21, include imaging pixels N for imaging and phase difference pixels ZL and ZR. FIG. 6 shows an example of a configuration of the imaging pixel N. FIG. 7 shows an example of configurations of the phase difference pixels ZL and ZR. Each of the phase difference pixels ZL and ZR receives one of luminous flux which is split in the X direction about the principal ray as a center.

As shown in FIG. 6, the imaging pixel N is configured to include a photodiode D1 as a photoelectric conversion element, a color filter CF, and a microlens ML. The color filter CF is disposed between the photodiode D1 and the microlens ML.

The color filter CF is a filter that transmits light of any of red (R), green (G), and blue (B). The microlens ML concentrates a luminous flux LF incident from an exit pupil EP of the imaging lens 12 to substantially the center of the photodiode D1 through the color filter CF.

As shown in FIG. 7, each of the phase difference pixels ZL and ZR is configured to include a photodiode D1, a light blocking layer SF, and a microlens ML. Similarly to the imaging pixel N, the microlens ML concentrates the luminous flux LF incident from the exit pupil EP of the imaging lens 12 on the substantially center of the photodiode D1.

The light blocking layer SF is formed of a metal film or the like and is disposed between the photodiode D1 and the microlens ML. The light blocking layer SF blocks a part of the luminous flux LF incident on the photodiode D1 through the microlens ML from light blocking.

In the phase difference pixel ZL, the light blocking layer SF blocks a negative-side (first side) in the X direction with respect to the center of the photodiode D1 as a reference. That is, in the phase difference pixel ZL, the light blocking layer SF makes the luminous flux LF from the first-side exit pupil EP1 incident on the photodiode D1 and blocks the luminous flux LF from the positive-side (second-side) exit pupil EP2 in the X direction.

In the phase difference pixel ZR, the light blocking layer SF blocks light from the positive-side (second side) in the X direction with respect to the center of the photodiode D1. That is, in the phase difference pixel ZR, the light blocking layer SF makes the luminous flux LF from the second-side exit pupil EP2 incident on the photodiode D1 and blocks the luminous flux LF from the negative-side (first-side) exit pupil EP1 in the X direction.

(Pixel Array)

Figure 8:
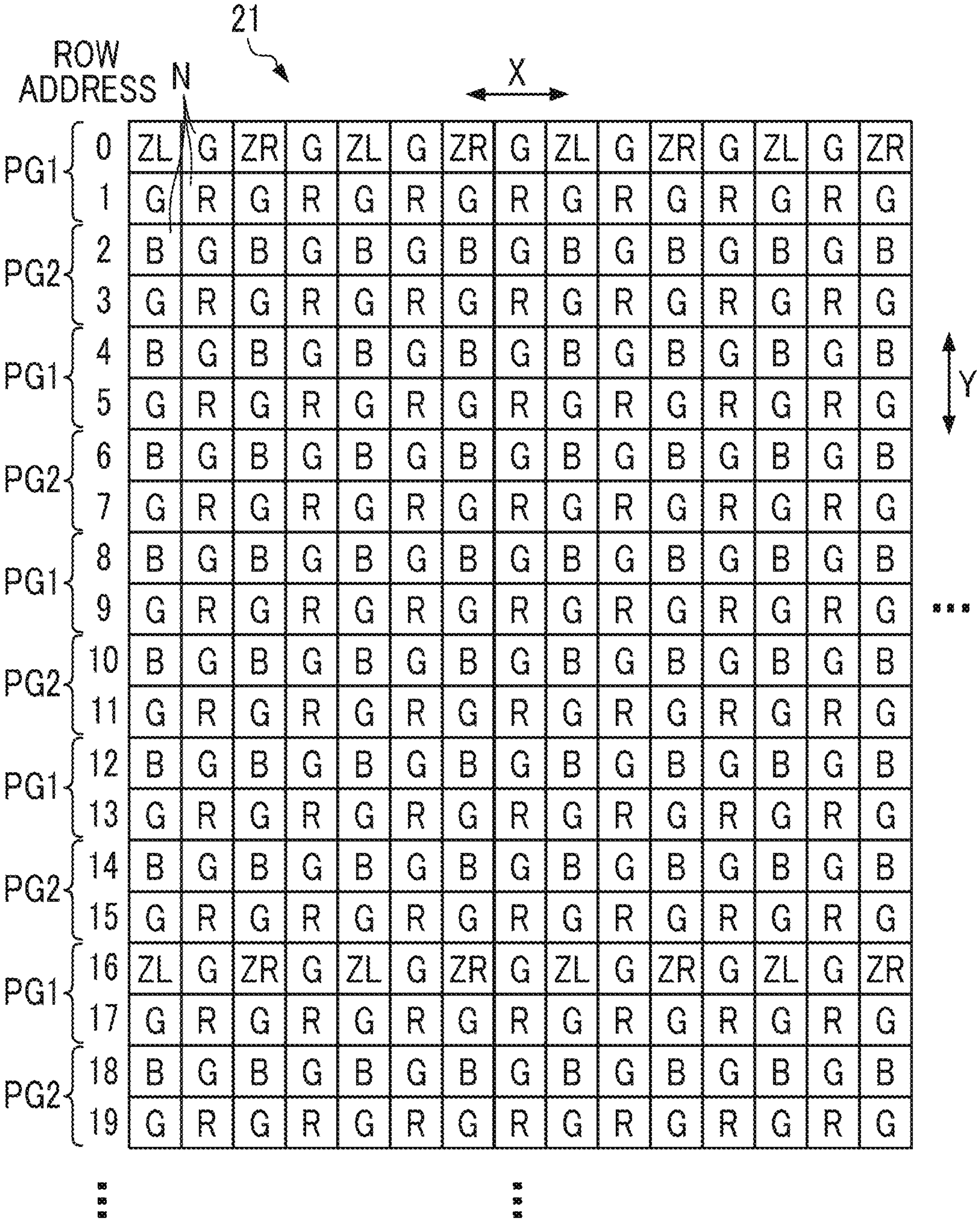
FIG. 8 is a diagram showing an example of pixel array of the imaging sensor.

FIG. 8 shows an example of pixel array of the imaging sensor 20. The color array of the color filters CF shown in FIG. 8 is a so-called Bayer array. The Bayer array is a color array in which a color filter CF of G is disposed on two diagonal pixels of four pixels of 2×2, and color filters CF of R and B are disposed on the other two pixels. The “R” in FIG. 8 indicates the imaging pixel N provided with the color filter CF of R. The “G” indicates the imaging pixel N provided with the color filter CF of G. The “B” indicates the imaging pixel N provided with the color filter CF of B. The color array of the color filter CF is not limited to the Bayer array and may be another color array.

The phase difference pixels ZL and ZR are disposed in the imaging region 21 by replacing a part of the imaging pixels N in the Bayer array. In the present embodiment, the phase difference pixels ZL and ZR are disposed to replace a part of the imaging pixel N provided with the color filter CF of B. The phase difference pixels ZL and ZR are arranged in the X direction. In the present embodiment, either of the phase difference pixels ZL and ZR is disposed every two pixels (that is, every other pixel) in the X direction. Consequently, one imaging pixel N is disposed between the phase difference pixel ZL and the phase difference pixel ZR.

The phase difference pixels ZL and ZR are arranged every 16 pixels in the Y direction. The plurality of imaging pixels N (G and B) are arranged between the phase difference pixels ZL which are arranged in the Y direction. The plurality of imaging pixels N (G and B) are arranged between the phase difference pixels ZR which are arranged in the Y direction.

The array pattern of the phase difference pixels ZL and ZR is not limited to the example shown in FIG. 8. For example, the phase difference pixels ZL and ZR may be disposed adjacent in the X direction.

The plurality of pixels 26 (refer to FIG. 5), which are included in the imaging region 21, are divided into first pixel groups PG1 and second pixel groups PG2. The first pixel group PG1 includes the plurality of phase difference pixels ZL and ZR and the plurality of imaging pixels N arranged in the X direction. The second pixel group PG2 includes the plurality of imaging pixels N arranged in the X direction. The first pixel groups PG1 and the second pixel groups PG2 are alternately arranged in the Y direction.

In the present embodiment, in a case where the row address is n (where n is a natural number including 0), the first pixel group PG1 includes a row having a row address of “4n” and a row having a row address of “4n+1”. Further, the second pixel group PG2 includes a row having a row address of “4n+2” and a row having a row address of “4n+3”. The phase difference pixels ZL and ZR are present in a row having a row address of “16n”. That is, only the first pixel group PG1 includes the phase difference pixels ZL and ZR.

Figure 9:
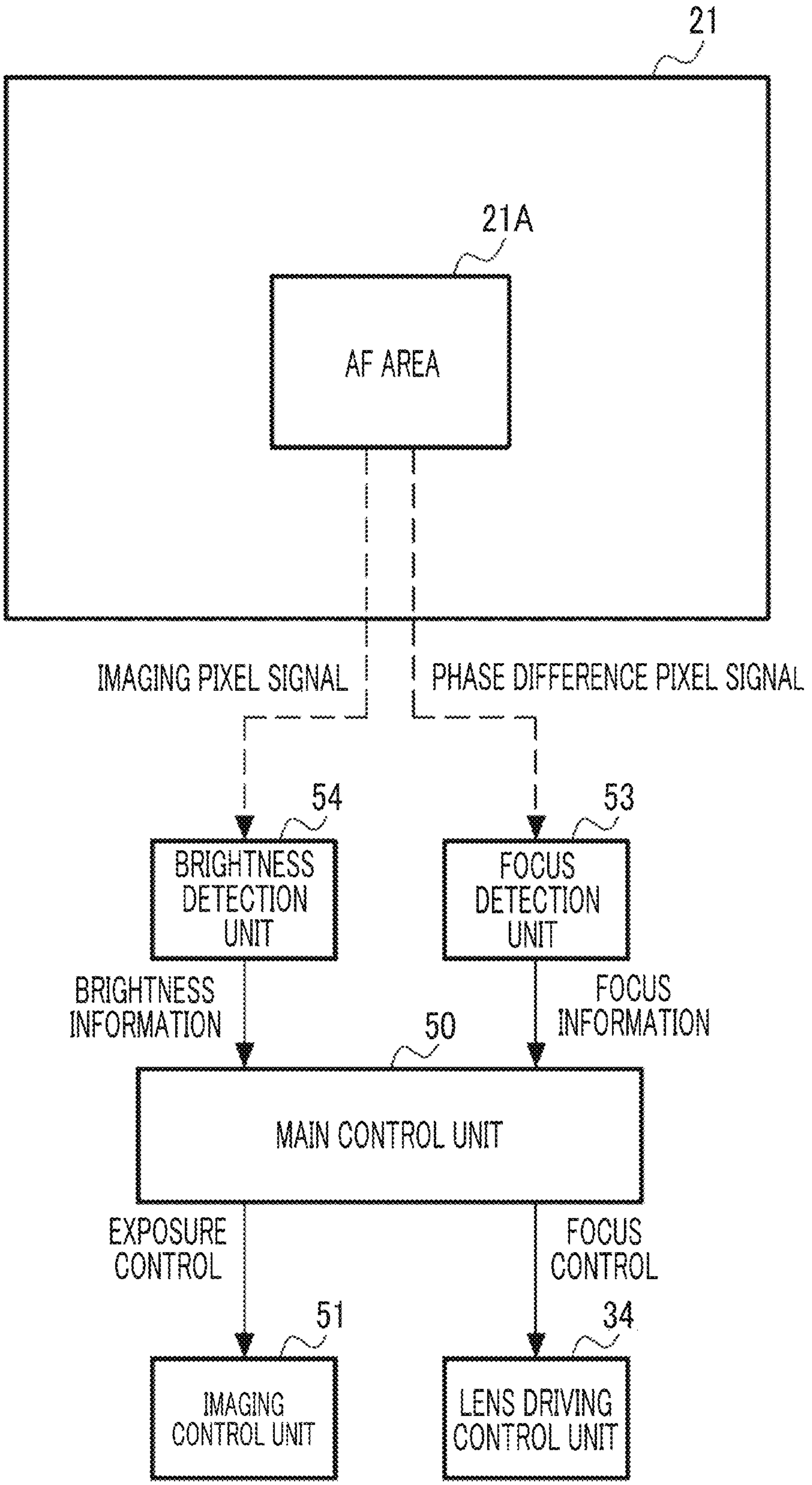
FIG. 9 is a diagram for explaining focus control and exposure control.

FIG. 9 shows the focus control and the exposure control performed by the main control unit 50. As shown in FIG. 9, the focus detection unit 53 generates focus information by performing focus detection on the basis of signals which are output from the phase difference pixels ZL and ZR (hereinafter referred to as phase difference pixel signals) included in the AF area 21A which is set in the imaging region 21. The focus information is information that indicates a position of the focus lens 31 in which the subject is in focus. Specifically, the focus detection unit 53 generates the focus information on the basis of phase difference between the phase difference pixel signal which is output from the phase difference pixel ZL and the phase difference pixel signal which is output from the phase difference pixel ZR, and outputs the generated focus information to the main control unit 50.

The brightness detection unit 54 generates brightness information that indicates the brightness of the AF area 21A on the basis of signals (hereinafter referred to as imaging pixel signals) which are output from the imaging pixels N included in the AF area 21A. For example, the brightness detection unit 54 calculates a luminance value for each pixel from the imaging pixel signals, and calculates an average luminance value in the AF area 21A. The brightness detection unit 54 outputs the calculated average luminance value as the brightness information to the main control unit 50. The brightness information is an example of the "information of the subject" according to the technique of the present disclosure.

The main control unit 50 controls the position of the focus lens 31 through the lens driving control unit 34 on the basis of the focus information which is input from the focus detection unit 53. Further, the main control unit 50 controls the exposure times of the first pixel groups PG1 and the second pixel groups PG2 through the imaging control unit 51 on the basis of the brightness information which is input from the brightness detection unit 54. Specifically, the main control unit 50 makes one of a first exposure time E1, during which the first pixel group PG1 is exposed, and a second exposure time E2, during which the second pixel group PG2 is exposed, shorter than the other, on the basis of the brightness information.

(Imaging Timing)

FIG. 10 and FIG. 11 show an example of the imaging timing of the imaging sensor 20 in a case where the motion picture imaging mode is set and the HDR function is turned on.

A frame cycle T of the motion picture imaging is defined by the vertical synchronization signal VD supplied from the imaging control unit 51 to the vertical scanning circuit 22. The vertical scanning circuit 22 supplies row selection signals SEL and reset signals RST to the first pixel groups PG1 and the second pixel groups PG2 on the basis of the vertical synchronization signal VD.

Specifically, the vertical scanning circuit 22 supplies the row selection signals SEL to the first pixel groups PG1 and the second pixel groups PG2 in synchronization with the vertical synchronization signal VD. In the present embodiment, the vertical scanning circuit 22 selects the row selection line L1 (refer to FIG. 5) while changing the row addresses in the order of 0, 1, 2, . . . , and supplies a row selection signal SEL to the selected row selection line L1.

The vertical scanning circuit 22 supplies the reset signals RST to the first pixel groups PG1 and the second pixel groups PG2 in accordance with the respective exposure times. The first exposure time E1 is a time (that is, a charge accumulation time) ranging from the input of the reset signal RST to the input of the row selection signal SEL in the first pixel group PG1. The second exposure time E2 is a time ranging from the input of the reset signal RST to the input of the row selection signal SEL in the second pixel group PG2. The exposure period shifts for each row. That is, the imaging sensor 20 performs exposure with the focal plane type electronic shutter.

It should be noted that a period in which the hatching is applied in FIGS. 10 and 11 is a light blocking period. The reset signal RST may be periodically supplied to the first pixel group PG1 and the second pixel group PG2 in the light blocking period. Further, the reset signal RST may be constantly supplied to the first pixel group PG1 and the second pixel group PG2 in the light blocking period.

FIG. 10 shows an example of imaging timing at which a brightness of the AF area 21A is equal to or greater than an optional first threshold value. In such a case, the main control unit 50 controls the reset timing such that E1<E2. FIG. 11 shows an example of imaging timing at which the brightness of the AF area 21A is less than the first threshold value. In such a case, the main control unit 50 controls the reset timing such that E2<E1.

(Exposure Control)

Figure 12:
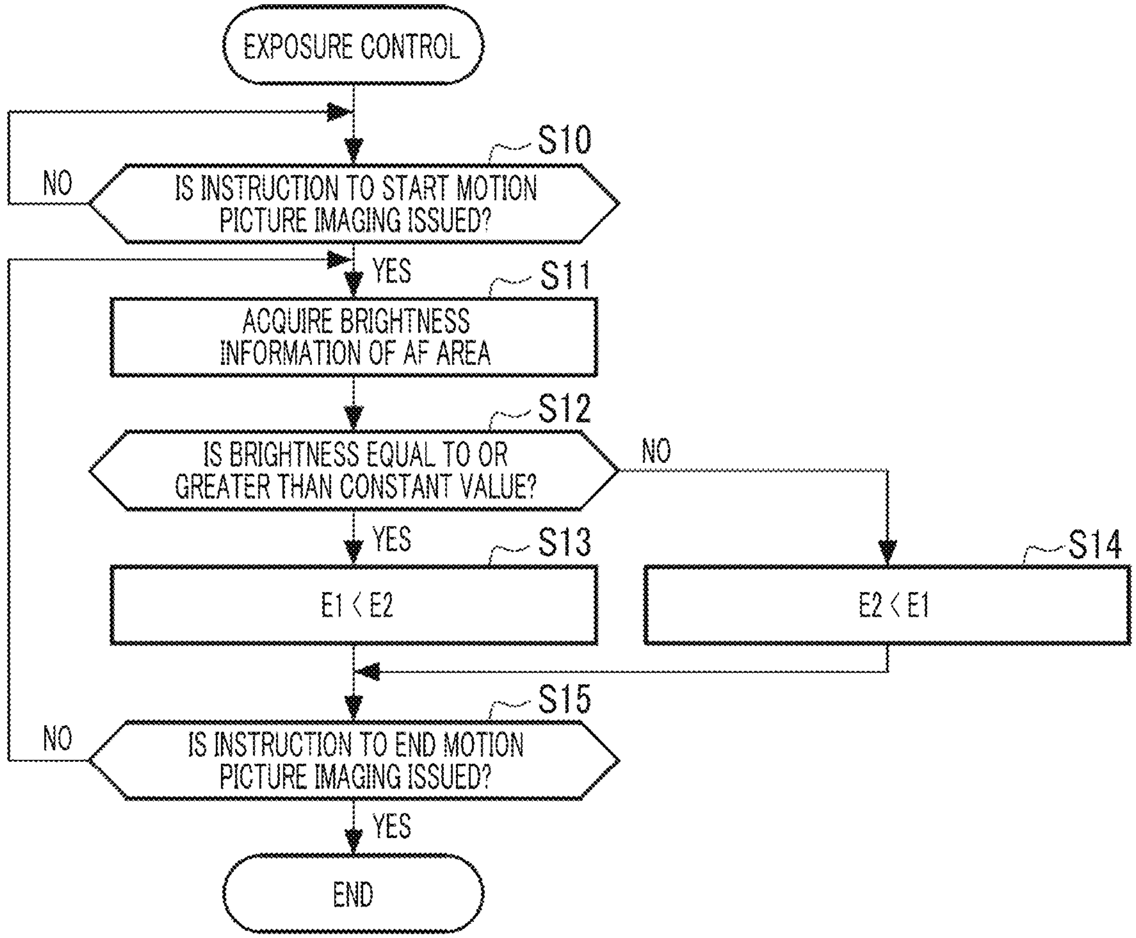
FIG. 12 is a flowchart for explaining an example of a flow of exposure control.

Next, an example of the flow of the exposure control in a case where the motion picture imaging mode is set and the HDR function is turned on will be described with reference to the flowchart shown in FIG. 12. First, the main control unit 50 determines whether or not an instruction to start the motion picture imaging is issued through the operation of the operating part 42 (step S10).

In a case where the main control unit 50 determines that the instruction to start the motion picture imaging is issued (step S10: YES), the main control unit 50 controls the imaging control unit 51 to perform the imaging operation on the imaging sensor 20 in the constant frame cycle T and acquire the brightness information of the AF area 21A from the brightness detection unit 54 (step S11). The main control unit 50 acquires the brightness information from the brightness detection unit 54 for each frame cycle T.

The main control unit 50 determines whether or not the brightness of the AF area 21A is equal to or greater than the first threshold value on the basis of the acquired brightness information (step S12). In a case where the main control unit 50 determines that the brightness of the AF area 21A is equal to or greater than the first threshold value (step S12: YES), the main control unit 50 controls the reset timing such that E1<E2 in the next frame cycle T (step S13). In contrast, in a case where the main control unit 50 determines that the brightness of the AF area 21A is less than the first threshold value (step S12: NO), the reset timing is set such that E2<E1 in the next frame cycle T (step S14).

Next, the main control unit 50 determines whether or not an instruction to end the motion picture imaging is issued through the operation of the operating part 42 (step S15). In a case where the main control unit 50 determines that no instruction to end the motion picture imaging is issued (step S15: NO), the main control unit 50 advances the processing to step S11 and acquires the brightness information again. The processing from step S11 to step S15 is repeatedly executed for each frame cycle T until it is determined in step S15 that the instruction to end the motion picture imaging is issued. Then, in a case where the main control unit 50 determines that the instruction to end the motion picture imaging is issued (step S15: YES), the main control unit 50 ends the processing.

As described above, in a case where the brightness of the AF area 21A is equal to or greater than the first threshold value, the main control unit 50 makes the first exposure time E1, in which the first pixel group PG1 including the phase difference pixels ZL and ZR is exposed, shorter than the second exposure time E2 in which the second pixel group PG2 not including the phase difference pixels ZL and ZR is exposed. As described above, in a case where the brightness of the AF area 21A is equal to or greater than the first threshold value, the main control unit 50 makes the first exposure time E1 shorter than the second exposure time E2 such that overexposure does not occur due to the saturation of the signals of the phase difference pixels ZL and ZR. Therefore, more accurate phase difference information can be obtained.

In contrast, in a case where the brightness of the AF area 21A is less than the first threshold value, the main control unit 50 makes the second exposure time E2, in which the second pixel group PG2 not including the phase difference pixels ZL and ZR is exposed, shorter than the first exposure time E1 in which the first pixel group PG1 including the phase difference pixels ZL and ZR is exposed. As described above, in a case where the brightness of the AF area 21A is less than the first threshold value, the main control unit 50 makes the first exposure time E1 longer than the second exposure time E2 such that blackout does not occur due to small signals of the phase difference pixels ZL and ZR. Therefore, more accurate phase difference information can be obtained.

Therefore, in a case where the first exposure time E1 and the second exposure time E2 are different from each other in order to expand the dynamic range, by executing the above-mentioned exposure control, the phase difference information with high accuracy can be obtained regardless of the brightness of the AF area 21A. Thereby, even in a case where the dynamic range is expanded, the focus adjustment of the phase difference method can be performed with high accuracy.

(HDR Synthesis Processing)

Figure 13:
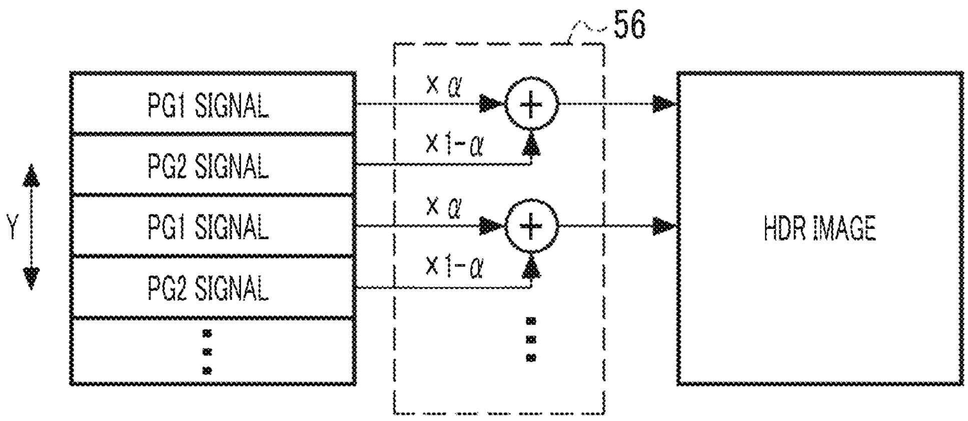
FIG. 13 is a diagram schematically showing an HDR synthesis processing.

FIG. 13 schematically shows the HDR synthesis processing performed by the HDR synthesis unit 56. The HDR synthesis unit 56 generates an HDR image by adding signals which are output from the first pixel groups PG1 and the second pixel groups PG2 adjacent to each other in the Y direction.

Specifically, the HDR synthesis unit 56 adds a signal, which is output from the first pixel group PG1 (hereinafter referred to as a PG1 signal), and a signal, which is output from the second pixel group PG2 (hereinafter referred to as a PG2 signal), for each pair of corresponding pixels. It should be noted that the pair of corresponding pixels means a pair of pixels which are located at the same address in the X direction and at different addresses by two pixels in the Y direction.

For example, in the HDR synthesis, only the imaging pixel signals are used without using the phase difference pixel signals. Therefore, regarding the phase difference pixels ZL and ZR, signals, which are obtained by performing pixel complementation using the imaging pixel signals of the imaging pixels N present around the phase difference pixels ZL and ZR in the first pixel groups PG1, are used in the HDR synthesis.

It should be noted that the HDR synthesis may be performed using the phase difference pixel signals in addition to the imaging pixel signal. Since the phase difference pixels ZL and ZR each have an amount of received light less than that of the imaging pixel N, the HDR synthesis unit 56 may perform gain correction of the phase difference pixel signal and use the phase difference pixel signals for the HDR synthesis.

The HDR synthesis unit 56 may synthesize the PG1 signals and the PG2 signals in an analog signal state, or may synthesize the PG1 signals and the PG2 signals after converting the signals into digital signals through A/D conversion. Further, the HDR synthesis unit 56 may synthesize the PG1 signals and the PG2 signals in a RAW data state, or may synthesize the PG1 signals and the PG2 signals after performing the demosaic processing.

Further, in the present embodiment, the HDR synthesis unit 56 adds a value, which is obtained by multiplying the PG1 signal by the coefficient $\alpha$, and a value which is obtained by multiplying the PG2 signal by the coefficient $1-\alpha$. Here, the coefficient $\alpha$ is a value that satisfies $0 \le \alpha \le 1$.

Figure 14:
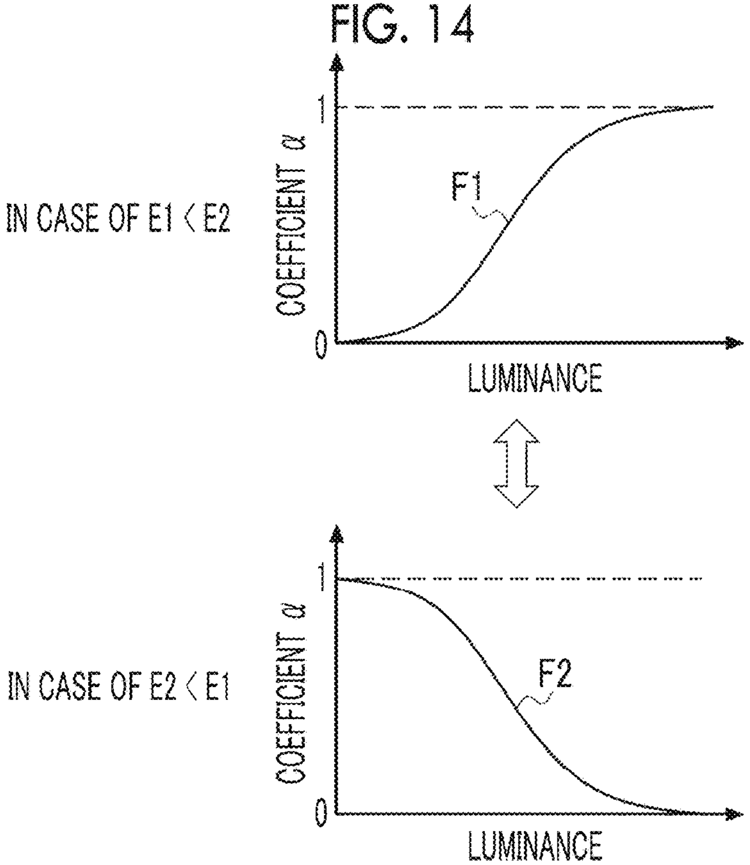
FIG. 14 is a graph showing an example of a relational expression between a coefficient α and a luminance of a pixel.

FIG. 14 is a graph showing an example of a relational expression between the coefficient $\alpha$ and the luminance of a pixel. On the basis of the relationship shown in FIG. 14, the HDR synthesis unit 56 obtains a coefficient $\alpha$ for each pair of pixels to be added, and performs addition of the PG1 signal and the PG2 signal.

In a case where $E1<E2$, the HDR synthesis unit 56 determines the coefficient $\alpha$ using a relational expression F1 in which the coefficient $\alpha$ increases in accordance with an increase in luminance. In contrast, in a case of $E2<E1$, the HDR synthesis unit 56 determines the coefficient $\alpha$ using a relational expression F2 in which the coefficient $\alpha$ decreases in accordance with the increase in luminance. In any case, the higher the luminance, the greater an addition ratio of the signals on a short-time exposure side. The luminance of the pixel is, for example, based on the brightness information (R, G, B signal values) of the pixels having the shorter exposure times.

Figure 15:
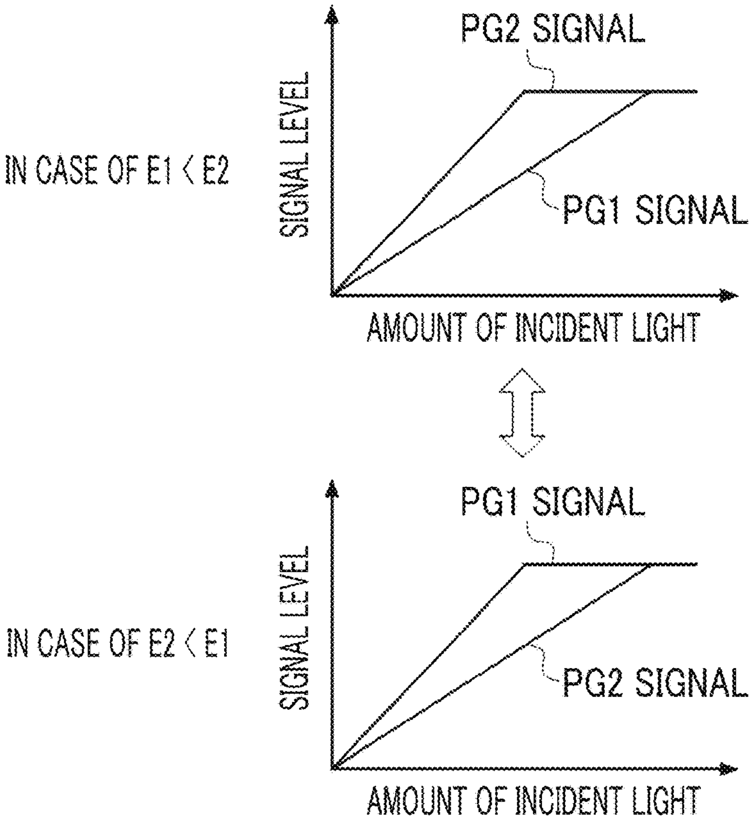
FIG. 15 is a diagram schematically showing signal levels of a PG1 signal and a PG2 signal with respect to an amount of incident light.

FIG. 15 is a diagram schematically showing signal levels of the PG1 signal and the PG2 signal with respect to an amount of incident light. In a case where $E1<E2$, the PG1 signal exerts an effect of increasing the sensitivity in a region where the amount of incident light is large, and the PG2 signal exerts an effect of increasing the sensitivity in a region where the amount of incident light is small. In contrast, in a case of $E2<E1$, the PG1 signal exerts an effect of increasing the sensitivity in a region in which the amount of incident light is small, and the PG2 signal exerts an effect of increasing the sensitivity in a region in which the amount of incident light is large. As a result, the dynamic range of the HDR image, which is generated by adding the PG1 signals and the PG2 signals, is expanded.

As described above, according to the technique of the present disclosure, it can be appropriately determined whether the pixel group including the phase difference pixels (the first pixel group PG1 in the present embodiment) is to be subjected to short-time exposure or long-time exposure.

Second Embodiment

Next, a second embodiment will be described. In the first embodiment, in a case where the HDR function is turned on in the motion picture imaging mode, the main control unit 50 performs exposure control on the basis of "brightness of the AF area 21A" as the information of the subject. In contrast, in the second embodiment, the main control unit 50 performs the exposure control on the basis of the "speed of movement of the subject" as the information of the subject.

In the present embodiment, for example, the main control unit 50 obtains the movement vector of the subject between frames on the basis of the video signal which is output from the imaging region 21 of the imaging sensor 20 for each frame cycle T, and detects the speed of movement of the subject. The main control unit 50 may detect the speed of movement of the subject on the basis of the video signal which is output from the AF area 21A.

Figure 16:
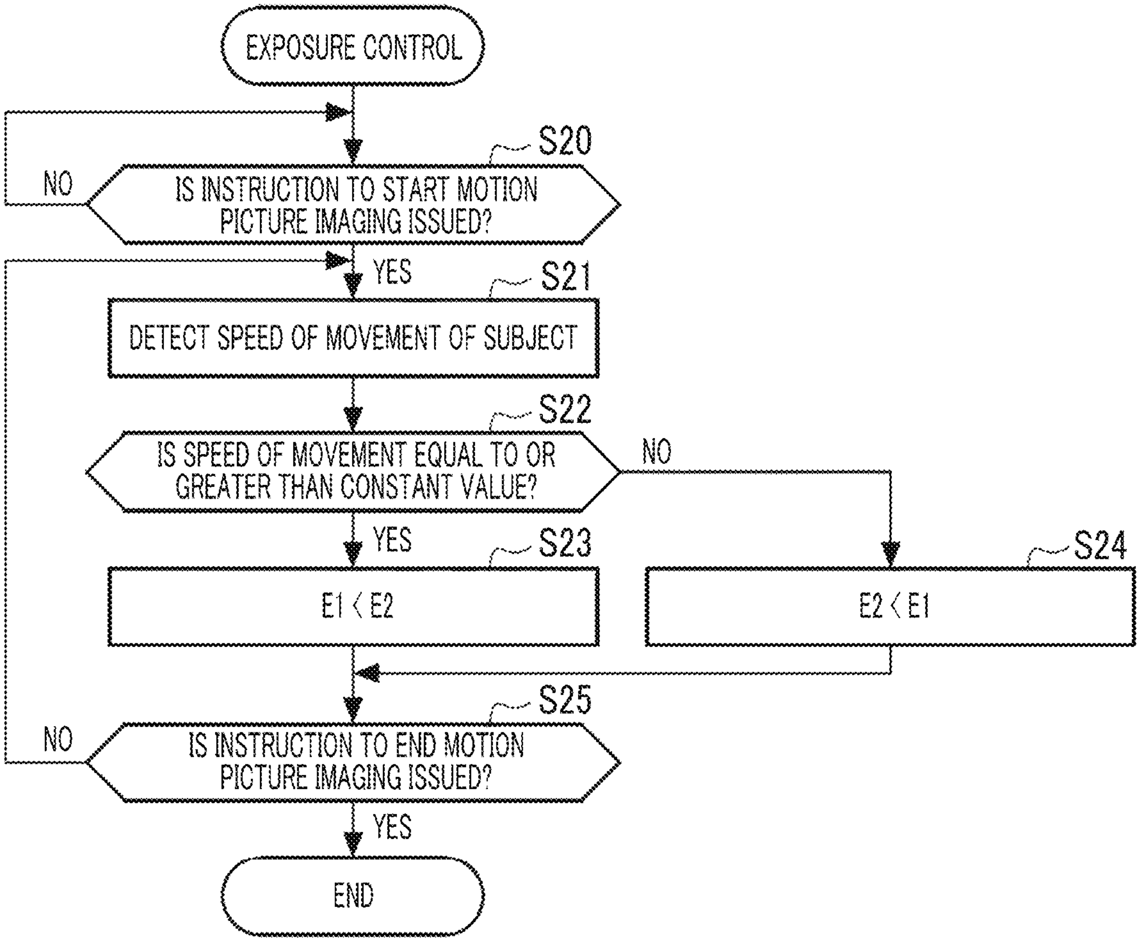
FIG. 16 is a flowchart for explaining an example of exposure control according to a second embodiment.

FIG. 16 shows an example of the exposure control according to the second embodiment. First, the main control unit 50 determines whether or not an instruction to start the motion picture imaging is issued through the operation of the operating part 42 (step S20).

In a case where the main control unit 50 determines that the instruction to start the motion picture imaging is issued (step S20: YES), the main control unit 50 controls the imaging control unit 51 to perform the imaging operation on the imaging sensor 20 in the constant frame cycle T and detect the speed of movement of the subject on the basis of the video signal which is output from the imaging sensor 20 (step S21).

The main control unit 50 determines whether or not the speed of movement is equal to or greater than an optional second threshold value on the basis of the detected speed of movement of the subject (step S22). In a case where the main control unit 50 determines that the speed of movement is equal to or greater than the second threshold value (step S22: YES), the main control unit 50 controls the reset timing such that E1<E2 in the next frame cycle T (step S23). In contrast, in a case where the main control unit 50 determines that the speed of movement is less than the second threshold value (step S22: NO), the main control unit 50 controls the reset timing such that E2<E1 in the next frame cycle T (step S24).

Next, the main control unit 50 determines whether or not an instruction to end the motion picture imaging is issued through the operation of the operating part 42 (step S25). In a case where the main control unit 50 determines that no instruction to end the motion picture imaging is issued (step S25: NO), the main control unit 50 advances the processing to step S21 and detects the speed of movement of the subject again. The processing from step S21 to step S25 is repeatedly executed for each frame cycle T until it is determined in step S25 that the instruction to end the motion picture imaging is issued. Then, in a case where the main control unit 50 determines that the instruction to end the motion picture imaging is issued (step S25: YES), the main control unit 50 ends the processing.

As described above, in a case where the speed of movement of the subject is equal to or greater than the second threshold value, the main control unit 50 makes the first exposure time E1, in which the first pixel group PG1 including the phase difference pixels ZL and ZR is exposed, shorter than the second exposure time E2 in which the second pixel group PG2 not including the phase difference pixels ZL and ZR is exposed. In contrast, in a case where the speed of movement of the subject is less than the second threshold value, the main control unit 50 makes the second exposure time E2, in which the second pixel group PG2 not including the phase difference pixels ZL and ZR is exposed, shorter than the first exposure time E1 in which the first pixel group PG1 including the phase difference pixels ZL and ZR is exposed.

As described above, in the present embodiment, in a case where the speed of movement of the subject is high, the phase difference information is acquired by shortening the exposure time. In contrast, in a case where the speed of movement of the subject is slow, the phase difference information is acquired in a state where the exposure time is lengthened and the subject is sufficiently exposed.

Third Embodiment

Next, a third embodiment will be described. In the first embodiment, as shown in FIGS. 10 and 11, the main control unit 50 selects row addresses in the order of 0, 1, 2, . . . and performs readout in a case of reading out the video signal from the imaging sensor 20. That is, in the first embodiment, the main control unit 50 alternately reads out signals from the first pixel groups PG1 and the second pixel groups PG2. In contrast, in the third embodiment, the main control unit 50 reads out one of the signals of the first pixel group PG1 and the second pixel group PG2, and then reads out the other of the signals of the first pixel group PG1 and the second pixel group PG2.

Figure 17:
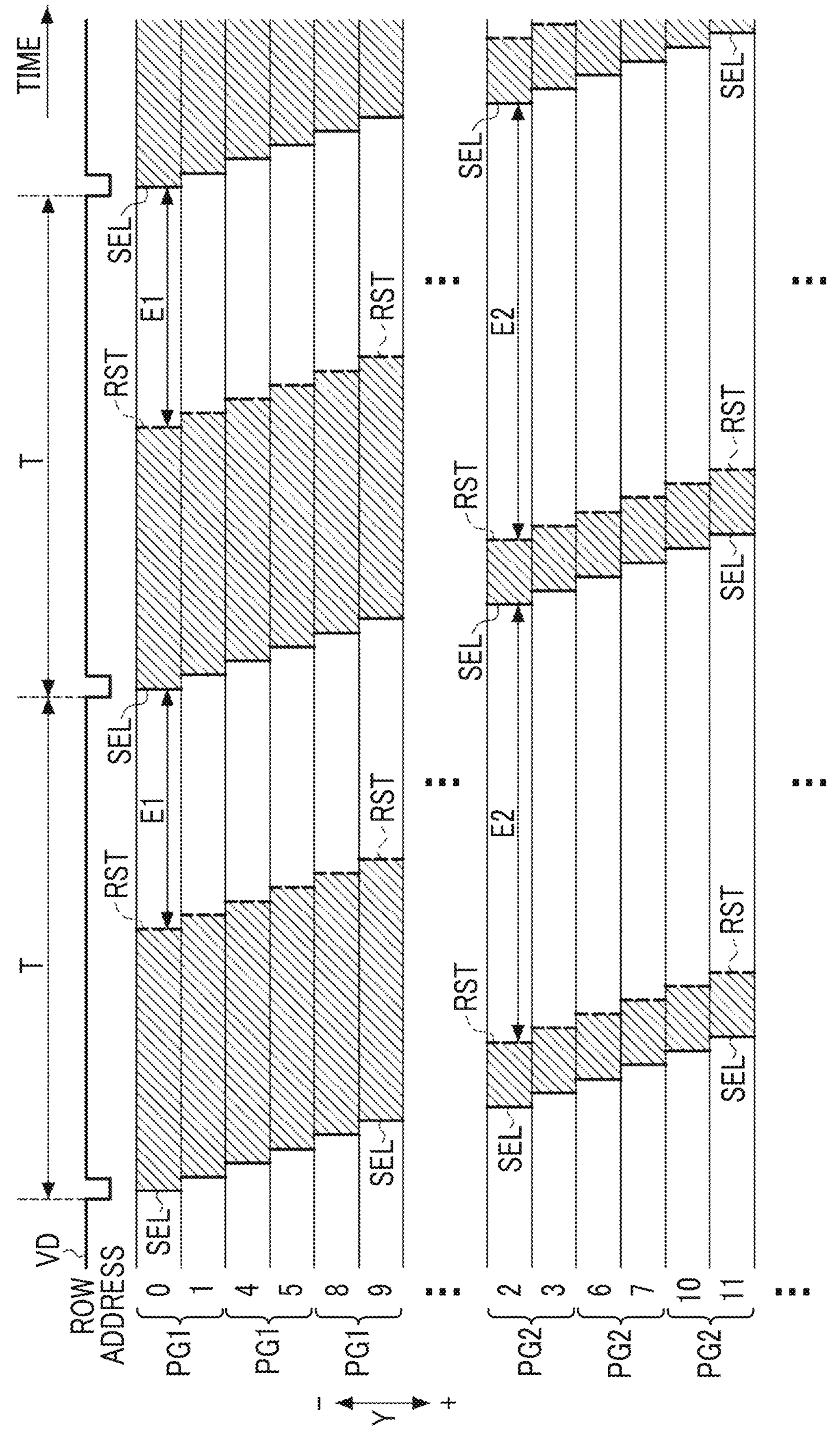
FIG. 17 is a diagram showing an example of imaging timing according to a third embodiment.

FIG. 17 shows an example of imaging timing according to the third embodiment. As shown in FIG. 17, in the present embodiment, first, the signal readout is performed by supplying the row selection signal SEL to the first pixel group PG1 of which the row addresses are "4n" and "4n+1". After that, signal reading is performed by supplying the row selection signal SEL to the second pixel group PG2 of which the row addresses are "4n+2" and "4n+3". It should be noted that the signal readout from the first pixel group PG1 and the signal readout from the second pixel group PG2 are successively performed in the same frame cycle T.

In the present embodiment, regarding the reset, in the same manner as in the signal readout, the first pixel group PG1 is reset, and then the second pixel group PG2 is reset.

Contrary to the example shown in FIG. 17, the main control unit 50 may read out the signal from the second pixel group PG2 and then read out the signal from the first pixel group PG1. However, since only the first pixel group PG1 includes the phase difference pixels ZL and ZR, it is preferable to perform the signal readout of the first pixel group PG1 before the signal readout of the second pixel group PG2. By reading out the signal of the first pixel group PG1 first, the phase difference information can be acquired in advance after the start of the frame period.

Further, in the example shown in FIG. 17, the main control unit 50 reads out the signals in the same direction with respect to the Y direction in both the first pixel group PG1 and the second pixel group PG2. Specifically, in a case where a direction in which the row address increases is set as a positive direction and a direction in which the row address decreases is set as a negative direction, in the example shown in FIG. 17, the main control unit 50 reads out the signals in the positive direction in both the first pixel group PG1 and the second pixel group PG2. The positive direction in the Y direction is an example of the term "one direction in the first direction" according to the technique of the present disclosure. Further, the negative direction in the Y direction is an example of the term "the other direction in the first direction" according to the technique of the present disclosure.

The signal readout direction may be reversed in the first pixel group PG1 and the second pixel group PG2. Further, the signal readout direction may be changed in accordance with the position of the subject in the imaging region 21.

Figure 18:
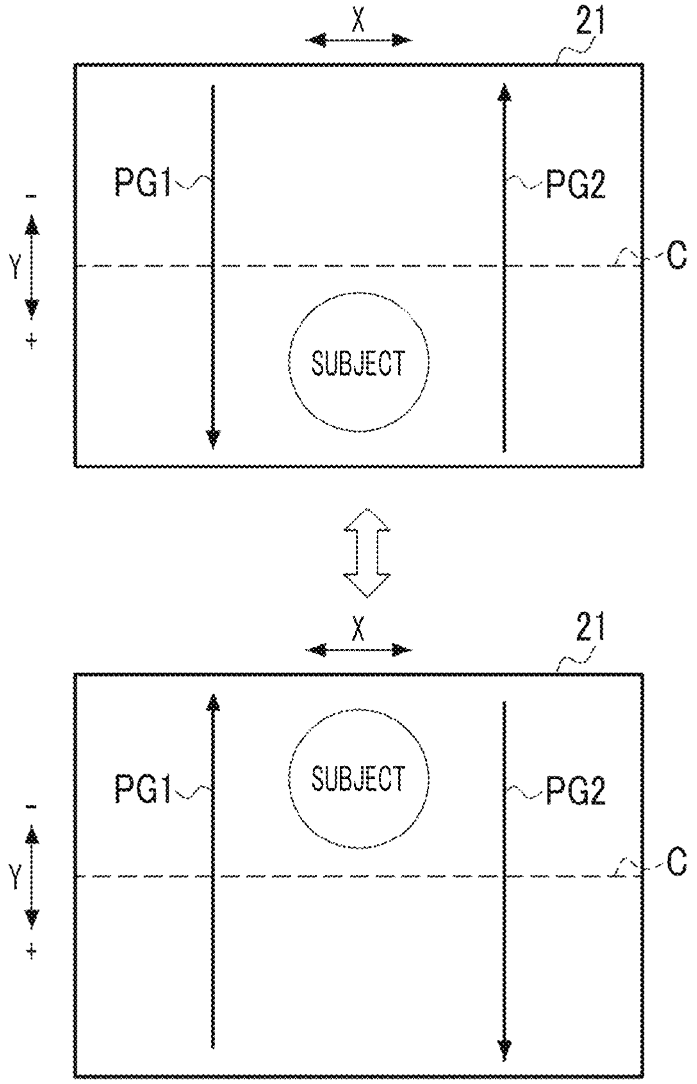
FIG. 18 is a diagram for explaining an example of changing a signal readout direction between a first pixel group and a second pixel group in accordance with a position of a subject.

FIG. 18 shows an example in which the signal readout directions of the first pixel group PG1 and the second pixel group PG2 are changed in accordance with the position of the subject. In the present example, the main control unit 50 performs subject detection (for example, face detection) on the basis of the video signal, which is output from the imaging sensor 20, to detect the position of the subject in the imaging region 21. In addition, the main control unit 50 determines which region the subject is located on the positive direction side or the negative direction side in the Y direction with respect to a virtual line C located at the center of the imaging region 21 in the Y direction.

In a case where the position of the subject is on the positive direction side with respect to the virtual line C, the main control unit 50 reads out a signal of the first pixel group PG1 in the positive direction from the negative direction side in the Y direction, and then reads out a signal of the second pixel group PG2 in the negative direction from the positive direction side in the Y direction. In contrast, in a case where the position of the subject is on the negative direction side with respect to the virtual line C, the main control unit 50 reads out the signal of the first pixel group PG1 in the negative direction from the positive direction side in the Y direction, and then reads out a signal of the second pixel group PG2 in the positive direction from the negative direction side in the Y direction.

In such a manner, by changing the signal readout directions of the first pixel group PG1 and the second pixel group PG2 in accordance with the position of the subject, temporal shift between the PG1 signal and the PG2 signal, which is read out from the vicinity of the subject, is reduced. Thereby, the image quality of the subject in the HDR image is improved.

In the example shown in FIG. 18, the signal of the first pixel group PG1 is read out before the signal of the second pixel group PG2, but the signal of the second pixel group PG2 may be read out before the signal of the first pixel group PG1. Further, in a case where the subject intersects with the virtual line C, the position of the subject may be determined on the basis of whether the center of gravity of the subject is located in a region on the positive direction side or the negative direction side with respect to the virtual line C. Furthermore, in a case where the subject intersects with the virtual line C, the position of the subject may be determined on the basis of whether the area of the subject is larger on the positive direction side or the negative direction side with respect to the virtual line C.

Fourth Embodiment

Next, a fourth embodiment will be described. In the first embodiment, the barycentric positions of the first pixel groups PG1 and the second pixel groups PG2 are shifted by two pixels in the Y direction. That is, the phase of each PG1 signal, which is read out from the first pixel group PG1, and the phase of each PG2 signal, which is read out from the second pixel group PG2, are shifted in the Y direction. In the fourth embodiment, the image processing unit 52 performs phase processing of reducing the phase shift between the PG1 signal and the PG2 signal, and then synthesizes the PG1 signal and the PG2 signal.

Figure 19:
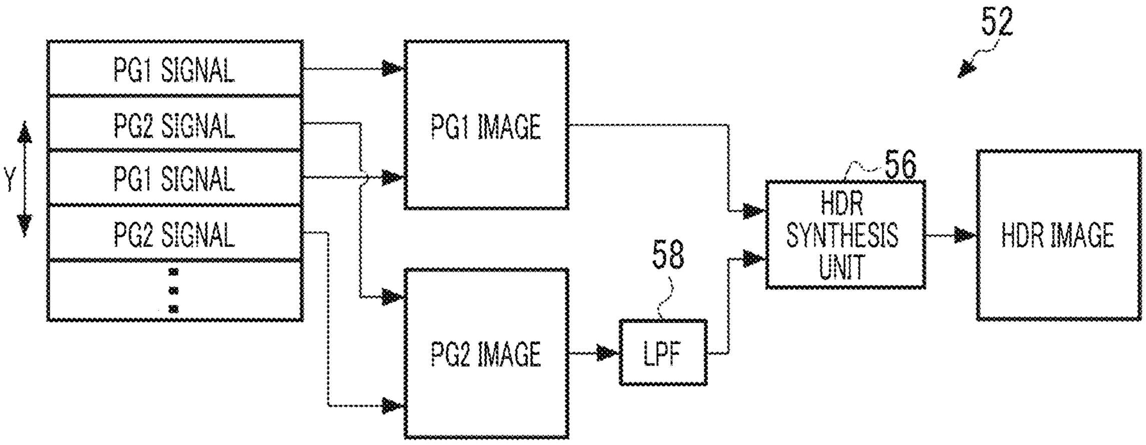
FIG. 19 is a diagram schematically showing an HDR synthesis processing including phase processing according to a fourth embodiment.

FIG. 19 schematically shows HDR synthesis processing including phase processing. In the present embodiment, the image processing unit 52 has a low-pass filter processing unit 58. The low-pass filter processing unit 58 performs a low-pass filter processing on a PG2 image of an image (hereinafter referred to as a PG1 image) generated by the PG1 signal and an image (hereinafter referred to as the PG2 image) generated by the PG2 signal. The PG1 and PG2 images are, for example, images subjected to demosaic processing.

In the present embodiment, the HDR synthesis unit 56 generates an HDR image by synthesizing the PG1 image and the PG2 image subjected to the low-pass filter processing. Since the PG2 image is an image in which the blurriness is generated by the low-pass filter processing, the phase shift in the PG1 image is reduced.

In the present embodiment, the low-pass filter processing is performed on the PG2 image. The reason for this is that the PG2 image is not the "main image" in both the case of the case where the subject is bright or the case where the subject is dark. For example, as shown in FIG. 12, in a case where the brightness of the AF area 21A is equal to or greater than the first threshold value, $E1<E2$. Therefore, the second pixel group PG2 is overexposed. On the contrary, in a case where the brightness of the AF area 21A is less than the first threshold value, $E2<E1$. Therefore, the second pixel group PG2 is underexposed. As described above, the second pixel group PG2 is overexposed in a case where the subject is bright and underexposed in a case where the subject is dark. Therefore, in both cases, the PG2 image, which is read out from the second pixel group PG2, is not the main image but the PG1 image is the main image.

As described above, in the present embodiment, the synthesis processing is performed after performing the low-pass filter processing on the image which is not the main image of the PG1 image and the PG2 image. Therefore, the phase shift can be reduced while suppressing the deterioration of the image quality.

It is also possible to reduce the phase shift between the PG1 signal and the PG2 signal by performing pixel complement processing on the PG2 image instead of the low-pass filter processing. The pixel signals at pixel positions corresponding to the PG1 image may be calculated through the pixel complement processing performed on the PG2 image. As described above, the phase processing is a concept which includes the low-pass filter processing and the pixel complement processing.

Fifth Embodiment

Next, a fifth embodiment will be described. As described above, in the first embodiment, the main control unit 50 executes a first mode including first setting processing of making one of the first exposure time E1 and the second exposure time E2 shorter than the other thereof and first synthesis processing of generating an HDR image (first video signal) by synthesizing the PG1 signals and the PG2 signals.

In the fifth embodiment, in addition to the first mode, the main control unit 50 is able to execute a second mode in which the exposure time is changed for each frame period. The second mode includes second setting processing and second synthesis processing. In the second setting processing, the main control unit 50 makes one of the first exposure time E1 and the second exposure time E2 in the first frame period and the first exposure time E1 and the second exposure time E2 in the second frame period subsequent to the first frame period shorter than the other. In the second synthesis processing, the main control unit 50 generates an HDR image (second video signal) by synthesizing signals which are read out from the first pixel groups PG1 and the second pixel groups PG2 in the first frame period and signals which are read out from the first pixel groups PG1 and the second pixel groups PG2 in the second frame period.

Figure 20:
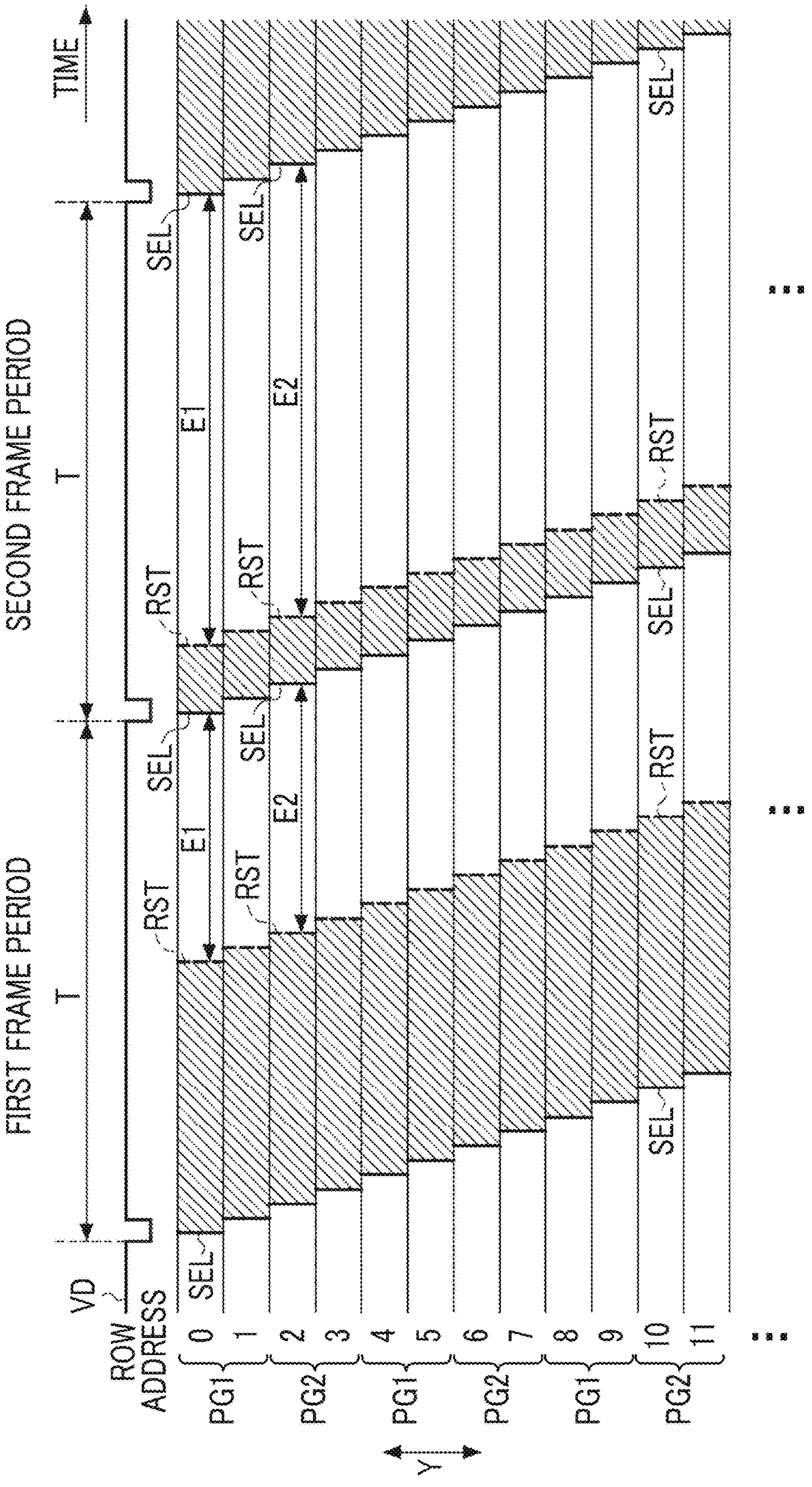
FIG. 20 is a diagram showing an example of imaging timing in a second mode according to a fifth embodiment.

FIG. 20 shows an example of imaging timing in the second mode. In the second mode, the first exposure time E1 is equal to the second exposure time E2 in each of the first frame period and the second frame period. That is, in the second mode, the main control unit 50 does not perform the exposure time setting processing on the basis of the brightness information of the AF area 21A.

Further, the first exposure time E1 and the second exposure time E2 are different between the first frame period and the second frame period. In the present embodiment, the first exposure time E1 and the second exposure time E2 in the first frame period are shorter than the first exposure time E1 and the second exposure time E2 in the second frame period. The first frame period and the second frame period are executed alternately and repeatedly for each frame cycle T.

In the second mode, the HDR image is generated by synthesizing the PG1 signal and the PG2 signal for two frames. Therefore, a resolution of the HDR image is high, but a frame rate is low. In contrast, in the first mode, the HDR image is generated by synthesizing the PG1 signal and the PG2 signal for each frame, the frame rate is high, but the resolution of the HDR image is low. Consequently, it is preferable that the main control unit 50 sets the setting upper limit value of the frame rate in the first mode to be higher than the setting upper limit value of the frame rate in the second mode.

Further, it is preferable that the main control unit 50 enables a user to select the first mode or the second mode by operating the operating part 42. Thereby, a user is able to select an appropriate mode depending on whether the user attaches importance to the resolution or the frame rate.

Sixth Embodiment

Next, a sixth embodiment will be described. In the first embodiment, as shown in FIG. 8, in the first pixel group PG1 and the second pixel group PG2, only the first pixel group PG1 includes the phase difference pixels ZL and ZR. In the sixth embodiment, the first pixel group PG1 includes the first phase difference pixels Z1L and Z1R, and the second pixel group PG2 includes the second phase difference pixels Z2L and Z2R.

Figure 21:
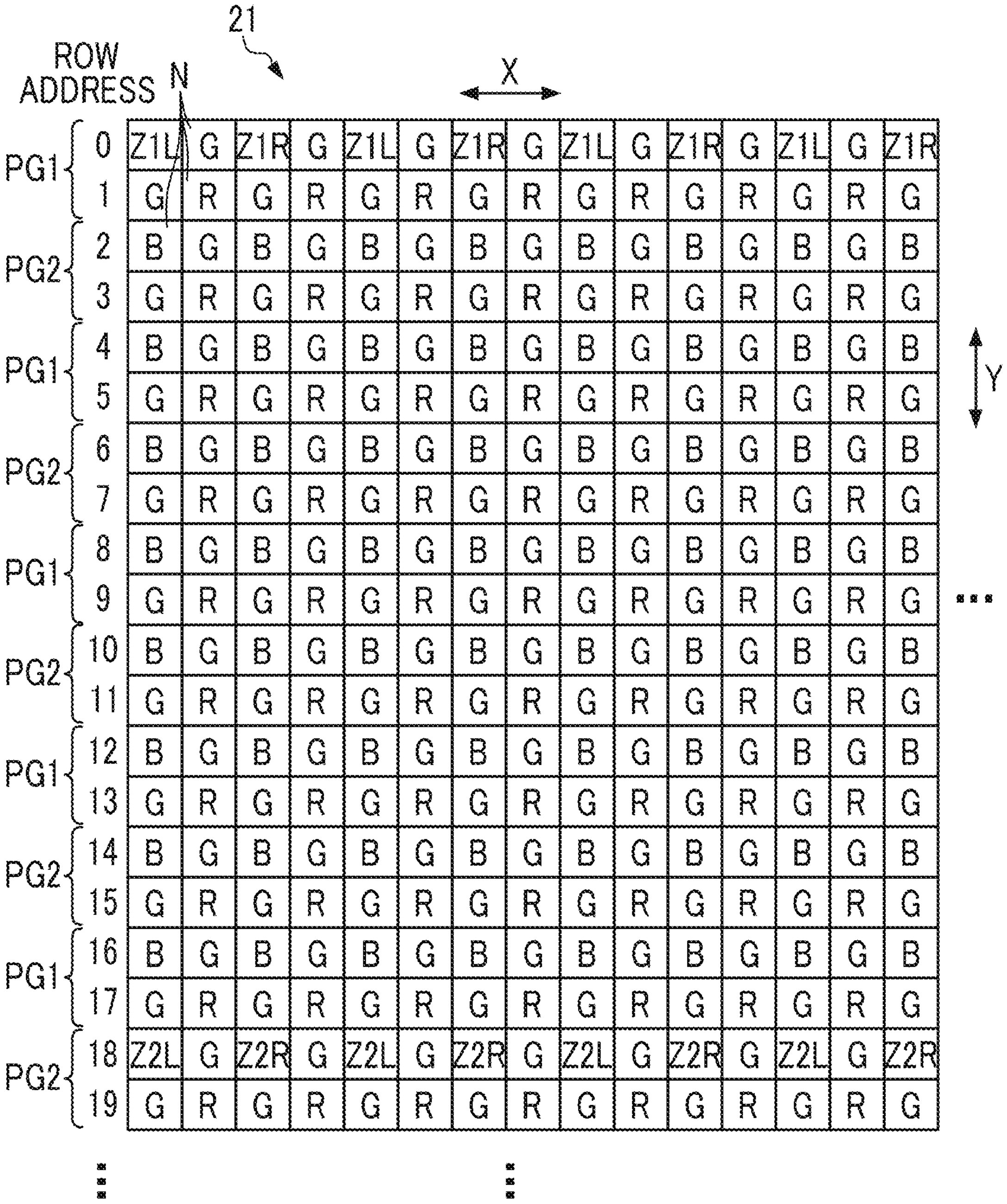
FIG. 21 is a diagram showing an example of pixel array of an imaging sensor according to a sixth embodiment.

FIG. 21 shows an example of a pixel array of the imaging sensor 20 according to the sixth embodiment. The first phase difference pixels Z1L and Z1R and the second phase difference pixels Z2L and Z2R are arranged alternately every 18 pixels in the Y direction. Consequently, the first pixel group PG1 includes the first phase difference pixels Z1L and Z1R, and the second pixel group PG2 includes the second phase difference pixels Z2L and Z2R.

Figure 22:
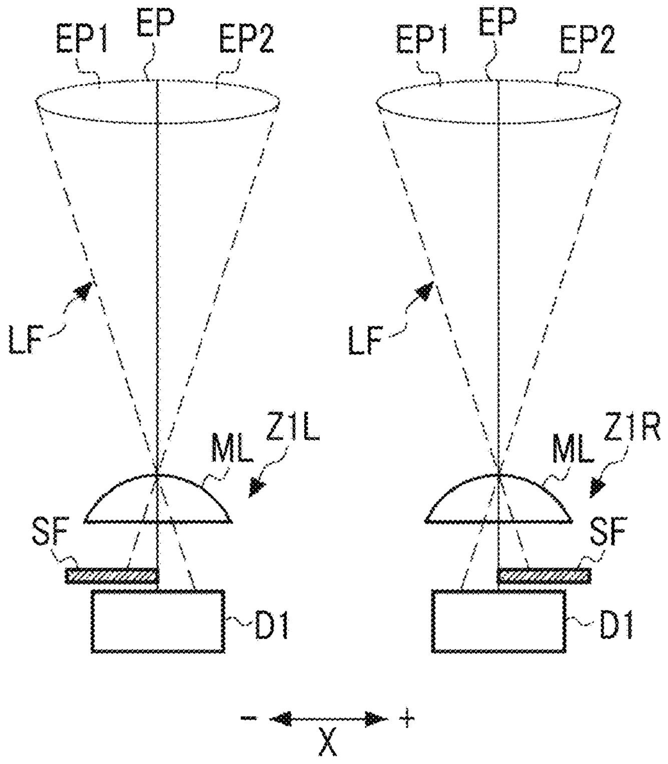
FIG. 22 is a diagram showing an example of a configuration of a first phase difference pixel.

FIG. 22 shows an example of configurations of the first phase difference pixels Z1L and Z1R. The first phase difference pixels Z1L and Z1R have the same configuration as the phase difference pixels ZL and ZR according to the first embodiment (refer to FIG. 7). In each of the first phase difference pixels Z1L and Z1R, the light blocking layer SF blocks light on about 50% of the light-receiving surface of the photodiode D1. Thus, each of the first phase difference pixels Z1L and Z1R has an aperture area of about 50% of the light receiving area of the photodiode D1 (hereinafter, referred to as a first aperture area).

Figure 23:
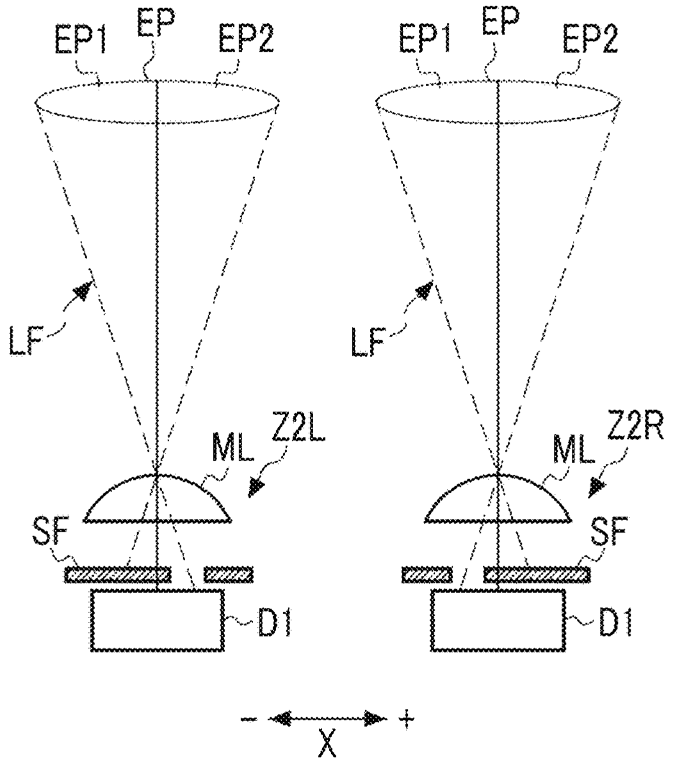
FIG. 23 is a diagram showing an example of a configuration of a second phase difference pixel.

FIG. 23 shows an example of configurations of the second phase difference pixels Z2L and Z2R. In the second phase difference pixels Z2L and Z2R, for example, the light blocking layer SF blocks light in an area of 50% or more of a light-receiving surface of the photodiode D1. Consequently, the second phase difference pixels Z2L and Z2R have a second aperture area which is smaller than the first aperture area of the first phase difference pixels Z1L and Z1R.

In the present embodiment, the main control unit 50 makes the first exposure time E1, during which the first pixel group PG1 is exposed, shorter than the second exposure time E2, during which the second pixel group PG2 is exposed, regardless of the brightness of the AF area 21A. Consequently, the exposure times of the first phase difference pixels Z1L and Z1R are set to be shorter than the exposure times of the second phase difference pixels Z2L and Z2R.

As described above, in the second pixel group PG2 of the long-time exposure in the present embodiment, the phase difference pixel signals are acquired through the second phase difference pixels Z2L and Z2R each having a small aperture area. Thus, the phase difference pixel signal is less likely to be overexposed. Further, in the first pixel group PG1 of short-time exposure, the phase difference pixel signals are acquired through the first phase difference pixels Z1L and Z1R each having a large aperture area. Therefore, the phase difference pixel signal is less likely to be blacked out. Therefore, in the present embodiment, it is possible to obtain information about the appropriate phase difference at which overexposure and underexposure do not occur.

Further, in the present embodiment, the phase difference pixel signal is less likely to be at a high level such that overexposure occurs or at a low level such that blackout occurs. Therefore, in a case where an HDR image is generated by using the phase difference pixel signal in addition to the imaging pixel signal, the image quality is improved.

Modification Example

In each of the above-mentioned embodiments, the HDR synthesis processing of synthesizing the PG1 signal and the PG2 signal is performed inside the imaging apparatus 10, but the configuration thereof may be made such that the PG1 signal and the PG2 signal are output as RAW data to the outside of the imaging apparatus 10. Further, the HDR synthesis processing may be performed by incorporating the PG1 signal and the PG2 signal, which are output from the imaging apparatus 10, into an external device such as a personal computer and using software installed in the external device.

Further, in each of the above-mentioned embodiments, the imaging sensor 20 is composed of the imaging region 21, the vertical scanning circuit 22, the line memory 23, the horizontal scanning circuit 24, and the output amplifier 25. However, the imaging sensor 20 may be composed of only the imaging region 21. The vertical scanning circuit 22, the line memory 23, the horizontal scanning circuit 24, and the output amplifier 25 may be provided inside the processor 40.

Further, each of the above-mentioned embodiments can be combined with each other as long as no contradiction occurs.

In the above-mentioned embodiments, various processors shown below can be used as the hardware structure of the control unit using the processor 40 as an example. The various processors include, in addition to the CPU, which is a general-purpose processor that functions by executing software (program), a processor such as an FPGA of which the circuit configuration can be changed after manufacturing. The FPGA includes a dedicated electric circuit, which is a processor having a circuit configuration specially designed for executing a specific processing, such as PLD or ASIC.

The control unit may be configured as one of the various processors, or may be configured as a combination of two or more of the same or different kinds of processors (for example, a combination of a plurality of FPGAs or a combination of a CPU and an FPGA). Further, the plurality of control units may be constituted of one processor.

A plurality of examples in which a plurality of control units are configured as one processor can be considered. In the first example, as represented by computers such as a client and a server, there is a form in which one processor is constituted of a combination of one or more CPUs and software and this processor functions as a plurality of control units. As a second example, as typified by system on chip (SOC), there is a form in which a processor that implements the functions of the whole system which includes a plurality of control units with one IC chip is used. As described above, the control unit can be configured by using one or more of the above-mentioned various processors as a hardware-like structure.

Further, as the hardware structure of these various processors, more specifically, it is possible to use an electric circuit in which circuit elements such as semiconductor elements are combined.

The contents described and illustrated above are detailed descriptions of the parts relating to the technique of the present disclosure, and are merely examples of the technique of the present disclosure. For example, the above description of the configuration, function, effect, and advantage is an example of the configuration, function, effect, and advantage of a portion relating to the technique of the present disclosure. Therefore, it is needless to say that unnecessary parts may be deleted, new elements may be added, or replacements may be made in the described contents and illustrated contents shown above without departing from the technical scope of the present disclosure. Further, in order to avoid complications and facilitate understanding of the parts relating to the technique of the present disclosure, in the description contents and the illustrated contents shown above, the description about common technical knowledge and the like which require special explanation in order to enable the implementation of the technique of the present disclosure is not given.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An imaging apparatus comprising:
a processor; and
an imaging element that has a first pixel group and a second pixel group arranged in a first direction, the first pixel group including a plurality of phase difference pixels and a plurality of imaging pixels and the second pixel group including a plurality of imaging pixels,
wherein the processor is configured to set a first exposure time during which the first pixel group including the plurality of phase difference pixels is exposed, and a second exposure time, during which the second pixel group is exposed,
wherein the processor is configured to set one of the first exposure time and the second exposure time shorter than the other, and determine which of the first exposure time and the second exposure time is made shorter than the other on the basis of information of a subject imaged by the imaging element.

2. The imaging apparatus according to claim 1, wherein the imaging element has column signal lines, which are for reading out signals and extend in the first direction, and the first pixel group includes the plurality of phase difference pixels and the plurality of imaging pixels that are arranged in a second direction intersecting the first direction and the second pixel group includes the plurality of imaging pixels arranged in the second direction.

3. The imaging apparatus according to claim 1,
wherein the processor is configured to
cause the imaging element to detect a brightness of a region-of-interest in an imaging region as the information, and determine the first exposure time and the second exposure time on the basis of the detected brightness.

4. The imaging apparatus according to claim 3,
wherein the processor is configured to
make the first exposure time shorter than the second exposure time in a case where the brightness is equal to or greater than a first threshold value, and
make the second exposure time shorter than the first exposure time in a case where the brightness is less than the first threshold value.

5. The imaging apparatus according to claim 1,
wherein the processor is configured to
detect a speed of movement of the subject as the information and determine the first exposure time and the second exposure time on the basis of the detected speed of movement.

6. The imaging apparatus according to claim 5,
wherein the processor is configured to
make the first exposure time shorter than the second exposure time in a case where the speed of movement is equal to or greater than a second threshold value, and
make the second exposure time shorter than the first exposure time in a case where the speed of movement is less than the second threshold value.

7. The imaging apparatus according to claim 1,
wherein the processor is configured to
read out a signal of one of the first pixel group and the second pixel group, and then read out a signal of the other of the first pixel group and the second pixel group, in a frame period.

8. The imaging apparatus according to claim 7,
wherein the processor is configured to
detect a position of the subject in an imaging region of the imaging element in the first direction,
read out a signal of one of the first pixel group and the second pixel group from the other direction side, and then read out a signal of the other of the first pixel group and the second pixel group from the one direction side, in a case where the detected position is on one direction side in the first direction, and
read out a signal of one of the first pixel group and the second pixel group from the one direction side, and then read out a signal of the other of the first pixel group and the second pixel group from the other direction side, in a case where the detected position is on the other direction side.

9. The imaging apparatus according to claim 1,
wherein the processor is configured to execute synthesis processing of generating a video signal by synthesizing a signal which is read out from the first pixel group and a signal which is read out from the second pixel group.

10. The imaging apparatus according to claim 9,
wherein the processor is configured to
execute phase processing of reducing a phase shift between the signal which is read out from the first pixel group and the signal which is read out from the second pixel group, and then execute the synthesis processing.

11. The imaging apparatus according to claim 10,
wherein the processor is configured to
perform the phase processing on the signal which is read out from the second pixel group.

12. The imaging apparatus according to claim 9,
wherein the processor is configured to
perform electronic vibration-proof processing on the video signal generated by the synthesis processing.

13. The imaging apparatus according to claim 1, wherein the processor is configured to switch which of the first pixel group and the second pixel group is subjected to a shorter exposure time based on the information of the subject.

14. The imaging apparatus according to claim 13,
wherein the information includes brightness of a region-of-interest in an imaging region, and
the processor is configured to
make the first exposure time shorter than the second exposure time in a case where the brightness is equal to or greater than a threshold value, and
make the second exposure time shorter than the first exposure time in a case where the brightness is less than the threshold value.

15. The imaging apparatus according to claim 13,
wherein the information includes a speed of movement of the subject, and
the processor is configured to
make the first exposure time shorter than the second exposure time in a case where the speed is equal to or greater than a threshold value, and
make the second exposure time shorter than the first exposure time in a case where the speed is less than the threshold value.

16. A driving method of an imaging apparatus including an imaging element that has a first pixel group and a second pixel group arranged in a first direction, the first pixel group including a plurality of phase difference pixels and a plurality of imaging pixels and the second pixel group including a plurality of imaging pixels, the driving method comprising:
setting a first exposure time during which the first pixel group including the plurality of phase difference pixels is exposed, and a second exposure time, during which the second pixel group is exposed,
wherein one of the first exposure time and the second exposure time is set shorter than the other, and the one of the first exposure time and the second exposure time which is set shorter than the other is determined on the basis of information of a subject imaged by the imaging element.

17. A non-transitory computer-readable storage medium storing a program for operating an imaging apparatus including an imaging element that has a first pixel group and a second pixel group arranged in a first direction, the first pixel group including a plurality of phase difference pixels and a plurality of imaging pixels and the second pixel group including a plurality of imaging pixels, the program causing the imaging apparatus to execute:
setting a first exposure time during which the first pixel group including the plurality of phase difference pixels is exposed, and a second exposure time, during which the second pixel group is exposed,
wherein one of the first exposure time and the second exposure time is set shorter than the other, and the one of the first exposure time and the second exposure time which is set shorter than the other is determined on the basis of information of a subject imaged by the imaging element.

* * * * *